United States Patent
Senda

(10) Patent No.: US 7,765,413 B2
(45) Date of Patent: Jul. 27, 2010

(54) IMAGE PROCESSING DEVICE AND METHOD OF CONTROLLING THE IMAGE PROCESSING DEVICE WHICH ESTIMATES A STATE-TRANSITION SEQUENCE FOR A USB DRIVER

(75) Inventor: Shigeya Senda, Shizuoka (JP)

(73) Assignee: Ricoh Company, Ltd., Tokyo (JP)

( * ) Notice: Subject to any disclaimer, the term of this patent is extended or adjusted under 35 U.S.C. 154(b) by 567 days.

(21) Appl. No.: 11/663,955

(22) PCT Filed: Jul. 26, 2006

(86) PCT No.: PCT/JP2006/314775

§ 371 (c)(1),
(2), (4) Date: Mar. 28, 2007

(87) PCT Pub. No.: WO2007/013512

PCT Pub. Date: Feb. 1, 2007

(65) Prior Publication Data

US 2008/0141050 A1      Jun. 12, 2008

(30) Foreign Application Priority Data

Jul. 28, 2005  (JP) .............. 2005-218792
Aug. 3, 2005   (JP) .............. 2005-225240
Jul. 25, 2006  (JP) .............. 2006-202443

(51) Int. Cl.
    *G06F 1/00* (2006.01)
(52) U.S. Cl. .................................. 713/300
(58) Field of Classification Search ........... 713/300
    See application file for complete search history.

(56) References Cited

U.S. PATENT DOCUMENTS 5,812,796 A * 9/1998 Broedner et al. .......... 710/302

(Continued)

FOREIGN PATENT DOCUMENTS

EP         1 178 667 A2    2/2002

(Continued)

OTHER PUBLICATIONS

U.S. Appl. No. 12/274,519, filed Nov. 20, 2008, Senda.

*Primary Examiner*—Thomas Lee
*Assistant Examiner*—Mohammed H Rehman
(74) *Attorney, Agent, or Firm*—Oblon, Spivak, McClelland, Maier & Neustadt, L.L.P.

(57) ABSTRACT

An object of the invention is to provide an image processing device having a sub-system performing a power saving control to support the use of a USB device or provided to allow the supporting of the use of a USB device, in which operational mismatching which may occur at a start of a the power saving mode between the USB device and a USB device driver provided in the main system of the image processing device can be effectively suppressed. A state of the USB device driver before the mode of the image processing device is changed to the power saving mode is held, and, when the state of the USB device acquired after the mode of the image processing device returns from the power saving mode differs from the held state of the USB device driver, an estimated state-transition sequence for changing a state of the USB device driver is determined by an ACPI driver based on a result of comparison of the held state of the USB device driver and the acquired state of the USB device, thereby changing the state of the USB device driver according to the estimated state-transition sequence.

12 Claims, 27 Drawing Sheets

U.S. PATENT DOCUMENTS

| | | | |
|---|---|---|---|
| 2003/0051069 A1* | 3/2003 | Iida | 709/321 |
| 2003/0055890 A1 | 3/2003 | Senda | |
| 2003/0088796 A1* | 5/2003 | Abdulkarim | 713/300 |
| 2004/0158756 A1* | 8/2004 | Totsuka et al. | 713/323 |
| 2006/0070045 A1 | 3/2006 | Senda | |

FOREIGN PATENT DOCUMENTS

| | | |
|---|---|---|
| JP | 2002-268471 | 9/2002 |
| JP | 2004-287838 | 10/2004 |
| JP | 2005-094679 | 4/2005 |

* cited by examiner

FIG.4

| ADDRESS | SIZE | MAJOR CLASS. | SIZE | DETAIL | | |
|---|---|---|---|---|---|---|
| 0xFFF.FFFF (0x1FC0.0000) 0X1F00.0000 | | | 16MB | 4MB | ROCS0 BOOTSWAP_N=1 CFG[6]=0 | SD ROCS0 BOOTSWAP_N=1 CFG[6]=0 |
| | | | | 12MB | | |
| 0x1EFF.FFFF 0X1E00.0000 | | | 16MB | ROCS1 | | |
| 0x1EFF.FFFF 0X1D00.0000 | 88MB | CODE ROM SPACE | 16MB | ROCS2 | | |
| 0x1EFF.FFFF 0X1C00.0000 | | | 16MB | ROCS3 | | |
| 0x1EFF.FFFF 0X1B00.0000 | | | 16MB | ROCS4 | | |
| 0x1AC0.0000~ | | | 4MB | CACS | | |
| 0x1A80.0000~ | | | 4MB | CACS | | ROCS0 |
| | | | MODE | PARALELL | SERIAL1 | SERIAL2 |
| 0x1A70.0000~ | 2MB | NVRAM SPACE | 1MB | NVCS0 | READ TRIGGER | READ/ WRITE |
| 0x1A60.0000~ | | | 1MB | | READ/WRITE | |
| 0x1A50.0000~ | 2MB | | 1MB | NVCS1 | READ TRIGGER | READ/ WRITE |
| 0x1A40.0000~ | | | 1MB | | READ/WRITE | |
| 0x1A30.0000~ | 1MB | LEGACY SPACE | 1MB | E0WR | ADDRESS DECODED OE/ME | |
| 0x1A20.0000~ | 1MB | | 1MB | E0RD | | |
| 0x1A10.0000~ | 1MB | | 1MB | RESERVED AREA (ERROR) | | |
| 0x1A08.0000~ | 512KB | RESERVED SPACE | 512KB | RESERVED AREA (ERROR) | | |
| 0x1A00.0000~ | 512KB | REGISTER SPACE | 512KB | REGISTERS OF FUNCTIONS | | |
| 0x1980.0000~ | 8MB | PCI I/O SPACE | 8MB | IPU/FCU/OPTION | | |
| 0x1800.0000~ | 24MB | PCI MEMORY SPACE | 24MB | IPU/FCU/OPTION/ROM | | |
| 0x17FF.FFFF ~ 0x0000.0000 | 384MB | SYSTEM ROM SPACE | 384MB | RCS2 | | |
| | | | | RCS1 | | |
| | | | | RCS1 | | |

FIG.14

| GIO TASK | INITIATION WAITING | TASK INITIATION END | P/S MODE CHANGE WAITING | POWER-SAVING MODE | WAITING OF RETURN FROM P/S MODE |
|---|---|---|---|---|---|
| (INITIATION) | TASK INITIALIZING, S. MANAGER TASK IS NOTIFIED OF END OF TASK INITIATION | | | | |
| SUB INITIATION | | | | | |
| MAIN INITIATION | | S. MANAGER TASK IS NOTIFIED OF END OF PREPARATION OF P/S MODE CHANGE | | | |
| P/S MODE CHANGE | | | GIO TASK RESET →POWER-SAVING MODE | | |
| P/S MODE CHANGE END | | | S. MANAGER TASK IS NOTIFIED THAT P/S MODE CHANGE IS SUSPENDED | | |
| P/S MODE CHANGE SUSPENDED | | | | | |
| MAIN SYSTEM RETURN REQUEST | | | | GIO TASK → WAITING OF RETURN FROM POWER SAVING MODE | |
| MAIN SYSTEM RETURN END | | | | | →TASK INITIATION END |
| INTERRUPT DETECTION | | | | S. MANAGER TASK IS NOTIFIED OF DETECTION OF RETURN FACTOR, GIO TASK | |

FIG. 15

| STATE-TRANSITION TABLE OF SUB MANAGER | | STATE | | | | | |
|---|---|---|---|---|---|---|---|
| | | SYSTEM INITIATION | | MAIN INITIATION | | SUB INITIATION | |
| | | 0 INITIALIZATION | 1 WAITING OF END OF MAIN INITIATION | 2 MAIN SYSTEM WORKING | 3 P/S MODE CHANGE | 4 POWER-SAVING MODE | 5 MAIN SYSTEM RETURN |
| EVENT | NOTICE OF END OF TASK INITIATION (ALL TASKS) | SUB INITIATION END NOTICE SENT TO ALL TASKS →1 | | | | | |
| | NOTICE OF END OF TASK INITIATION NG/TIMEOUT | SC INDICATION →SUB SYSTEM STOP | | | | | |
| | NOTICE OF END OF MAIN INITIATION (MAIN SYSTEM) | | MAIN INITIATION END NOTICE SENT TO ALL TASKS →2 | | | | MAIN INITIATION END NOTICE SENT TO ALL TASKS →2 |
| | NOTICE OF END OF MAIN INITIATION NG/TIMEOUT | | SC INDICATION →SUB SYSTEM STOP | | | | SC INDICATION →SUB SYSTEM STOP |
| | MESSAGE FROM MAIN SYSTEM (COMM. DRIVER) | | | SENT TO EACH TASK | DISCARDED | | |
| | REQUEST FOR PREPARATION OF P/S MODE CHANGE (MAIN SYSTEM) | | | PREPARATION REQUEST SENT TO EACH TASK →3 | | | |
| | NOTICE OF END OF PREPARATION OF P/S MODE CHANGE (ALL TASKS) | | | | PREPARATION END NOTICE SENT TO MAIN SYSTEM | | |
| | NOTICE OF END OF PREPARATION OF P/S MODE CHANGE NG/TIMEOUT | | | | PREPARATION NG NOTICE SENT TO MAIN SYSTEM →SUB SYSTEM STOP | | |
| | REQUEST FOR START OF P/S MODE CHANGE (MAIN SYSTEM) | | | | MODE CHANGE START REQUEST SENT TO ALL TASKS →4 | | |
| | KIND OF RETURN FACTOR (SW,iFILTER, USB RESPONSE, TIMER, GIO, ERR.INT., PANEL TASKS) | | | | | RETURN PREPARATION REQUEST SENT TO ALL TASKS →5 | |
| | KEY INPUT INFORMATION (PANEL TASK) | *2 | *2 | | | | DISCARDED |
| | NOTICE OF END OF MAIN RETURN PREPARATION (ALL TASKS) | | | | | | MAIN RETURN START REQUEST SENT TO ALL TASKS |
| | NOTICE OF END OF MAIN RETURN PREPARATION NG/TIMEOUT | | | | | | SC INDICATION →SUB SYSTEM STOP |
| | PM PROCESS INFORMATION (PM TASK) | DISPLAY COMMAND SENT TO PANEL TASK | DISPLAY COMMAND SENT TO PANEL TASK | | | DISPLAY COMMAND SENT TO PANEL TASK | DISPLAY COMMAND SENT TO PANEL TASK |
| | SUB ERROR NOTICE (ALL TASKS) | SUB ERROR NOTICE PROCESS →SUB SYSTEM STOP (NOTICE METHOD DIFFERS BY TASK STATE) | | | | | |

BLANK: ILLEGAL EVENT ERROR; MISMATCH BETWEEN STATE AND EVENT

*1: MAIN INITIATION END NOTICE AND MONITOR EVENTS ARE NOT FOR ERROR DETECTION; ERROR OCCURS FOR OTHER EVENTS
*2: DEPENDING ON PANEL TASK STATE; BY PERMITTED TIME TO DETECT INITIAL INPUT KEY; REFER TO PANEL TASK STATE TRANSITION; PERMITTED AS EVENT

FIG.16

STATE-TRANSITION TABLE OF PM TASK

| STATE-TRANSITION TABLE OF PM TASK | SYSTEM INITIATION | | MAIN INITIATION | | SUB INITIATION | |
|---|---|---|---|---|---|---|
| | 0 INITIALIZATION | 1 WAITING OF END OF MAIN INITIATION | 2 MAIN SYSTEM WORKING | 3 P/S MODE CHANGE | 4 POWER-SAVING MODE | 5 MAIN SYSTEM RETURN EVENT |
| (INITIALIZATION END) | TASK INITIATION END NOTICE →1 | | | | | |
| NOTICE OF END OF SUB INITIATION | | | | | | →-2 |
| NOTICE OF END OF MAIN INITIATION | | →-2 | | | | |
| REQUEST FOR PREPARATION OF P/S MODE CHANGE | | | PREPARATION END NOTICE →OK:3/NG:2 | | | |
| DETECTION OF P/S MODE CHANGE | | | | MODE CHANGE PROCESS, MODE CHANGE NOTICE →4 | | |
| REQUEST FOR PREPARATION OF MAIN SYSTEM RETURN | | | | | STOP OF RETURN FACTOR DETECTION, PREPARATION END NOTICE →5 | |
| REQUEST FOR START OF MAIN SYSTEM RETURN | | | | | | MAIN SYSTEM RETURN PROCESS, INITIATION END NOTICE →2 |
| NOTICE OF SUB SYSTEM STOP | OPERATION STOP | OPERATION STOP | OPERATION STOP | OPERATION STOP | OPERATION STOP | OPERATION STOP |
| (ERROR DETECTION) | SUB ERROR NOTICE | SUB ERROR NOTICE | SUB ERROR NOTICE | SUB ERROR NOTICE | SUB ERROR NOTICE | SUB ERROR NOTICE |

BLANK: ILLEGAL EVENT ERROR; MISMATCH BETWEEN STATE AND EVENT
EVENT ( ) IS TASK INTERNAL PROCESS

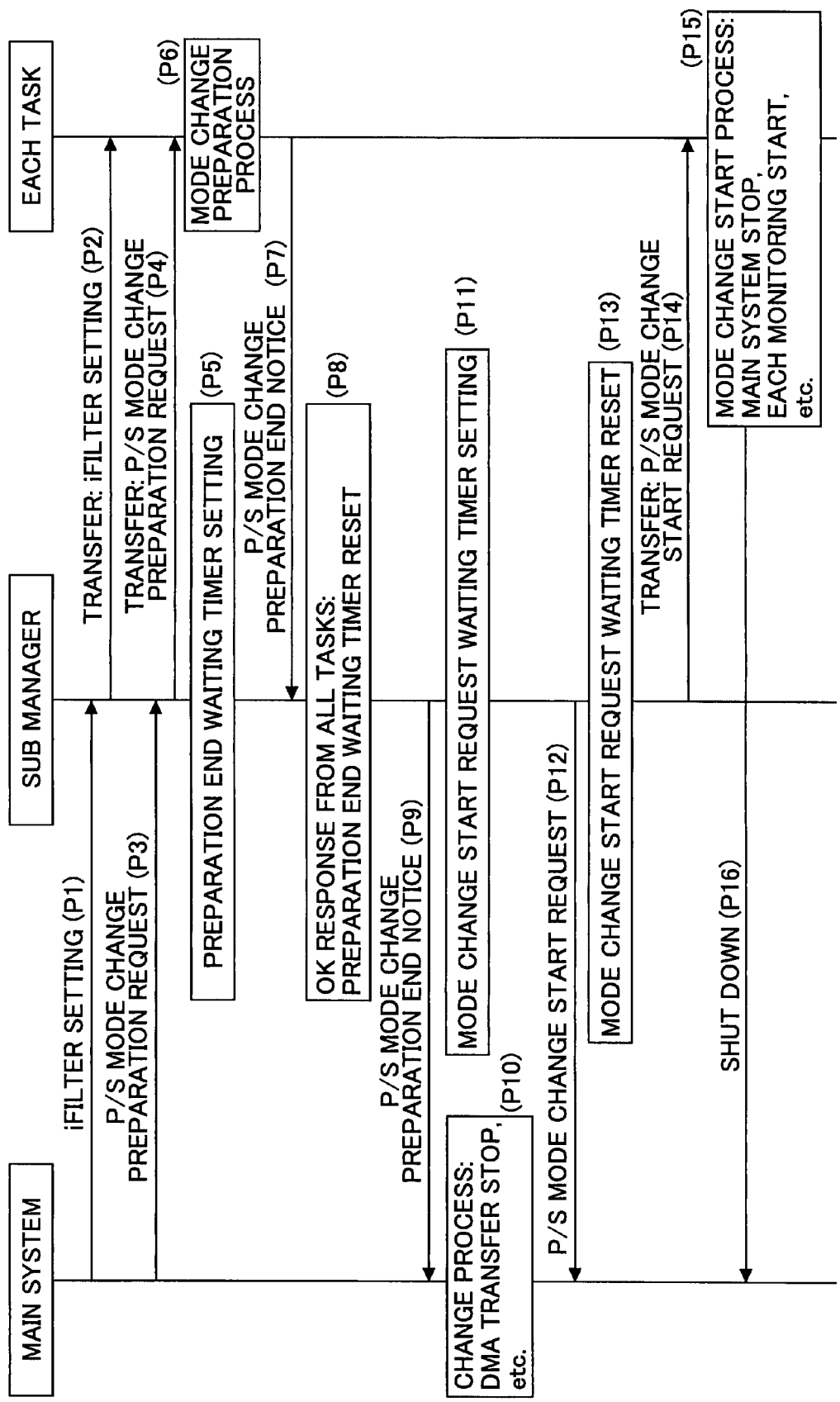

| STATE-TRANSITION TABLE OF USB RESPONSE TASK | | SYSTEM INITIATION | | MAIN INITIATION | | | SUB INITIATION | |
|---|---|---|---|---|---|---|---|---|
| | | 0 | 1 | 2 | 3 | 4 | 5 |
| | | INITIALIZATION | WAITING OF END OF MAIN INITIATION | MAIN SYSTEM WORKING | P/S MODE CHANGE | POWER-SAVING MODE | MAIN SYSTEM RETURN |
| EVENT | (INITIALIZATION END) | TASK INITIATION END NOTICE →1 | | | | | |
| | NOTICE OF END OF SUB INITIATION | | −2 | | | | |
| | NOTICE OF END OF MAIN INITIATION | | →2 | | | | |
| | USB BASIC INFO. | | | USB BASIC INFO. SETTING | | | |
| | USB STRING DESCRIPTOR INFO. | | | USB STRING DESCRIPTOR INFO. SETTING | | | |
| | REQUEST FOR PREPARATION OF P/S MODE CHANGE | | | PREPARATION END NOTICE →OK:3/NG:2 | | | |
| | REQUEST FOR START OF P/S MODE CHANGE | | | | START OF DETECTION OF RETURN FACTOR→4 | | |
| | MANUAL REQUEST (SET S. DESCRIPTOR) | | | | MANUAL RESPONSE | | |
| | MANUAL REQUEST (NON-SET S. DESCRIPTOR) | | | | →SUB ERROR NOTICE | | |
| | (DETECTION OF RETURN FACTOR) | | | | | S. MANAGER IS NOTIFIED OF USB RETURN FACTOR | |
| | REQUEST FOR PREPARATION OF MAIN SYSTEM RETURN | | | | | STOP OF R/F DETECTION, PREPARATION END NOTICE→5 | |
| | REQUEST FOR START OF MAIN SYSTEM RETURN | | | | | | MAIN SYSTEM RETURN PROCESS |
| | NOTICE OF SUB SYSTEM STOP | OPERATION STOP | OPERATION STOP | OPERATION STOP | OPERATION STOP | OPERATION STOP | OPERATION STOP |
| | (ERROR DETECTION) | SUB ERROR NOTICE | SUB ERROR NOTICE | SUB ERROR NOTICE | SUB ERROR NOTICE | SUB ERROR NOTICE | SUB ERROR NOTICE |

BLANK: ILLEGAL EVENT ERROR; MISMATCH BETWEEN STATE AND EVENT
EVENT ( ) IS TASK INTERNAL PROCESS

IMAGE PROCESSING DEVICE AND METHOD OF CONTROLLING THE IMAGE PROCESSING DEVICE WHICH ESTIMATES A STATE-TRANSITION SEQUENCE FOR A USB DRIVER

TECHNICAL FIELD

This invention relates to an image processing device, including an image input unit and an image processing unit which processes an input image data to generate an output image data (or image data being outputted to a printer or an external device), such as a printer, a facsimile, and a multi-function peripheral having multiple functions including copier, printer, scanner and facsimile functions, which are connectable to a network. More particularly, this invention relates to an image processing device which is provided to have a power saving mode in which the image processing device is set in a power-saving state.

BACKGROUND ART

A MFP (multi-function peripheral) which has multiple functions including copier, printer, scanner and facsimile functions is widely used as an image processing device which performs image processing to process an input image data into an output image data. The MFP is connected to a network, receives input image data of paper documents through the scanner of the MFP, and receives other image data (document) from an external device via the communication I/F (interface) of the MFP. After the inputted images are processed through the image processing to generate output image data, the output images are printed out by the plotter of the MFP or the output image data are outputted to the external device connected with the MFP.

Conventionally, the image processing device of the above type is provided with a power saving mode in order to reduce the power consumption of the device. When an idle state of the image processing device is detected, the normal operating mode of the image processing device is changed to the power saving mode. And the image processing device returns from the power saving mode to the normal operating mode when a predetermined return condition is detected.

A control system of an image processing device which includes a sub-system which operates in the power saving mode in order to realize the power saving function is known from the patent document 1, for example. This sub-system manages the power supply of a main system which controls the whole image processing device during a normal operation, and carries out operation of the power saving mode. That is, in the power saving state, the sub-system turns off the CPU power supply of the main system, performs the network response and the monitoring of the relevant units, and, when returning from the power saving state, returns the main system to the normal operating mode again. This enables reduction of large power consumption for systems having a large CPU supply power.

In the control system of the patent document 1, an ASIC with a built-in programmable sequencer which constitutes the sub-system controls the sequences of the change to the power saving mode and the return from the power saving mode. For example, the return from the power saving mode is initiated when pressing of the operation panel switch or opening of the device cover is performed as a return trigger.

PATENT DOCUMENT 1: Japanese Laid-Open Patent Application No. 2002-268471

SUMMARY OF THE INVENTION

Problems to be Solved by the Invention

In the control system of the patent document 1, reception of a signal transmitted via the network interface (I/F) from an external device is disclosed an example of the return conditions from the power saving mode. However, there is no disclosure in the patent document 1 of a USB (universal serial bus) interface which has recently been a general-purpose I/F for connecting peripheral devices to the image processing device of this kind (MFP).

When a USB device (which is an external device connected by the USB interface) is attached to the image processing device of this kind (MFP) and the power supply to the attached USB device is turned on even in the power saving mode, operational mismatching may occur at the start of the power saving mode between the USB device and the USB device driver provided in the main system whose power supply is turned OFF in the power saving mode. The problem of the mismatching remains unsolved by the conventional technology.

The reason why the above-mentioned mismatching occurs is that, when a change of the USB device itself or a change of the device state is effected by attaching or detaching of the USB device in the power saving mode, the main system whose power supply is turned off in the power saving mode cannot recognize the change.

This invention is made in view of the above-mentioned problems, and an object of the invention is to provide an improved image processing device having a sub-system performing a power saving control to support the use of a USB device or provided to allow the supporting of the use of a USB device, in which mismatching which may occur at a start of the power saving mode between the USB device and the USB device driver provided in the main system of the image processing device can be effectively suppressed.

Disclosure of the Invention

In an embodiment of the invention which solves or reduces one or more of the above-mentioned problems, there is provided an image processing device including a main control unit and a sub-control unit, the main control unit controlling each of an image input unit, an image processing unit, and an image output unit, the sub-control unit controlling power supply to the main control unit to change a mode of the image processing device to a the power saving mode and to cause the mode of the image processing device to return from the power saving mode, and the sub-control unit controlling response and transmission of a network interface and a USB device provided in the image processing device for inputting or outputting of image data, the image processing device comprising: a state holding unit holding a state of a USB device driver provided in the main control unit; a state transition unit changing a state of the USB device driver; and a state acquiring unit acquiring a state of the USB device, wherein the state holding unit holds a state of the USB device driver before the mode of the image processing device is changed to the power saving mode, and, when the state of the USB device acquired by the state acquiring unit after the mode of the image processing device returns from the power saving mode differs from the held state of the USB device driver held by the state holding unit, the state transition unit determines an estimated state-transition sequence for changing a state of the USB device driver, based on a result of comparison of the held state of the USB device driver and the acquired state of the USB device, thereby changing the state of the USB device driver according to the estimated state-transition sequence.

The above-mentioned image processing device may be configured so that the state transition unit is provided to determine, when the acquired state of the USB device is nearer to a communication-permitted state than the held state of the USB device driver, an estimated state-transition sequence which indicates a state transition from the held state of the USB device driver to the acquired state of the USB device.

The above-mentioned image processing device may be configured so that the state transition unit is provided to determine, when the held state of the USB device driver is nearer to a communication-permitted state than the acquired state of the USB device, an estimated state-transition sequence which indicates a state transition from an initial state to the acquired state of the USB device.

The above-mentioned image processing device may be configured so that the image processing device is provided to stop performing direct memory access DMA for transferring data of the USB device when changing to the power saving mode, and start, when returning from the power saving mode, performing the direct memory access DMA according to a state of the USB device driver after an end of the state transition.

The above-mentioned image processing device may be configured so that the sub-control unit is provided to cause the mode of the image processing device to return from the power saving mode when receiving of data input from the USB device is detected.

The above-mentioned image processing device may be configured so that the sub-control unit is provided to cause the mode of the image processing device to return from the power saving mode when hot swapping of the USB device is detected.

In an embodiment of the invention which solves or reduces one or more of the above-mentioned problems, there is provided a method of controlling an image processing device including a main control unit and a sub-control unit, the main control unit controlling each of an image input unit, an image processing unit, and an image output unit, the sub-control unit controlling power supply to the main control unit to change a mode of the image processing device to a the power saving mode and to cause the mode of the image processing device to return from the power saving mode, and the sub-control unit controlling response and transmission of a network interface and a USB device provided in the image processing device for inputting or outputting of image data, the method comprising: a state holding step of holding a state of a USB device driver provided in the main control unit; a state transition step of changing a state of the USB device driver; and a state acquiring step of acquiring a state of the USB device, wherein a state of the USB device driver before the mode of the image processing device is changed to the power saving mode is held in the state holding step, and, when the state of the USB device acquired in the state acquiring step after the mode of the image processing device returns from the power saving mode differs from the held state of the USB device driver held in the state holding step, an estimated state-transition sequence for changing a state of the USB device driver is determined in the state transition step, based on a result of comparison of the held state of the USB device driver and the acquired state of the USB device, thereby changing the state of the USB device driver according to the estimated state-transition sequence.

The above-mentioned method of controlling the image processing device may be configured so that the state transition step is provided to determine, when the acquired state of the USB device is nearer to a communication-permitted state than the held state of the USB device driver, an estimated state-transition sequence which indicates a state transition from the held state of the USB device driver to the acquired state of the USB device.

The above-mentioned method of controlling the image processing device may be configured so that the state transition step is provided to determine, when the held state of the USB device driver is nearer to a communication-permitted state than the acquired state of the USB device, an estimated state-transition sequence which indicates a state transition from an initial state to the acquired state of the USB device.

The above-mentioned method of controlling the image processing device may be configured so that the image processing device is provided to stop performing direct memory access DMA for transferring data of the USB device when changing to the power saving mode, and start, when returning from the power saving mode, performing the direct memory access DMA according to a state of the USB device driver after an end of the state transition.

The above-mentioned method of controlling the image processing device may be configured so that the mode of the image processing device is caused to return from the power saving mode when receiving of data input from the USB device is detected.

The above-mentioned method of controlling the image processing device may be configured so that the mode of the image processing device is caused to return from the power saving mode when hot swapping of the USB device is detected.

EFFECT OF THE INVENTION

According to the embodiments of the image processing device and the controlling method of the invention, the operation of returning from the power saving mode of the main control system is performed by detection of the data input from a USB device or detection of hot swapping of a USB device. In the image processing device to which the USB device is connected, without causing mismatching between the state of the USB driver and the state of the USB device, it is possible to make the mode of the main control system to change to the power saving mode and return from the power saving mode according to the return conditions, and it is possible to improve the performance of the image processing device.

In addition, the mismatching which may occur between the state of the USB device connected and the state of the USB device driver provided in the main control system is suppressed by the operation performed at the time of the power saving mode, and the operational problem which may occur at the time of returning from the power saving mode can be avoided and proper operation can be ensured.

BRIEF DESCRIPTION OF THE DRAWINGS

FIG. 4 is a diagram showing the memory map of ASIC1 in the control system of FIG. 1.

FIG. 14 is a diagram showing a state transition table of a GIO task in the sub-system of FIG. 13.

FIG. 15 is a diagram showing a state transition table of a sub-manager in the sub-system of FIG. 13.

FIG. 16 is a diagram showing a state transition table of a PM task in the sub-system of FIG. 13.

FIG. 17 is a diagram showing an example of the change sequence to the power saving mode of the control system of FIG. 1.

FIG. 19 is a diagram showing a state transition table of a panel task in the sub-system of FIG. 13.

FIG. 20 is a diagram showing a state transition table of a USB task in the sub-system of FIG. 13.

Figure 1:
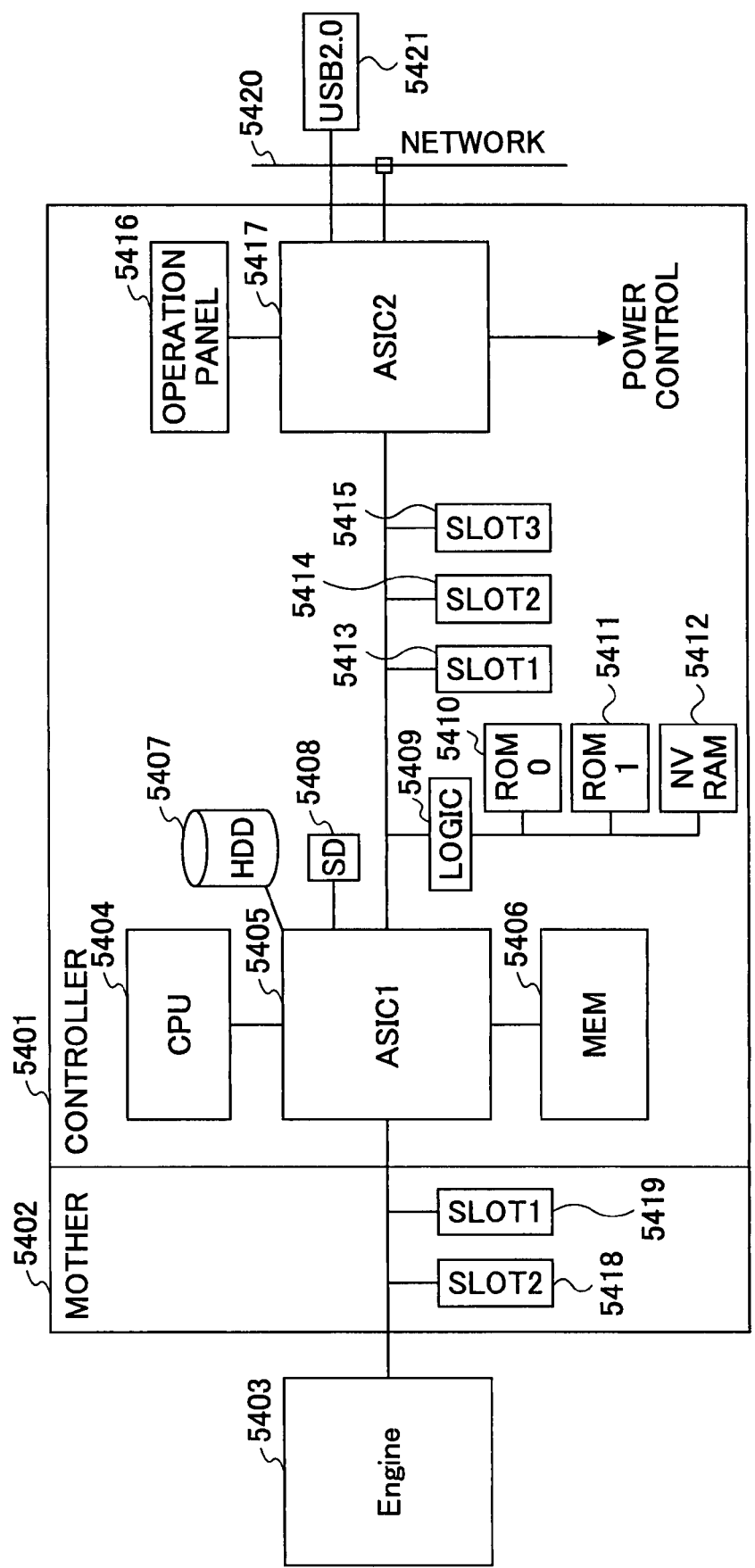
FIG. 1 is a block diagram showing the hardware composition of a control system of an image processing device in an embodiment of the invention.

DESCRIPTION OF REFERENCE NUMERALS 5401 controller
5403, 5267 engine
5404, 5201 CPU
5405, 5202 ASIC1
5406 memory
5407 HDD
5408 SD
5410 ROM0
5411 ROM1
5412 NVRAM
5416 operation panel
5417, 5264 ASIC2
5420 network I/F
5421 USB2.0 I/F
5014 general-purpose OS
5370 CPU
1301 sub-manager
1304 PM task
1305 SW_iFilter task
1306 communication Driver
1307 USB response task
1308 panel task
1309 error interruption task
1310 GIO task
1312 timer task
2001 process I/F
2007 ACPI driver
2008 network driver
2009 USB driver

BEST MODE FOR CARRYING OUT THE INVENTION

A description will now be given of an embodiment of the invention with reference to the accompanying drawings.

First, a description will be given of an embodiment of the image processing device of the invention which is applied to an MFP (multi-function peripheral) which has multiple functions including copier, facsimile, printer and scanner functions.

The basic composition of a control system in the MFP of this embodiment will be explained. This control system has the composition for realizing a power saving function (which performs operations of changing to the power saving mode and returning from the power saving mode) besides the multiple image processing functions of the MFP. The control system is configured so that it includes a main control system and a sub control system which controls operation of the power saving mode.

The main control system controls each of an image input unit (which inputs an image from the scanner provided in the image input unit or the connected external device), an image processing unit processing the input image to generate output image data, and an image output unit outputting the image data. The sub control system controls the power supply to the main control system to change the mode of the image processing device to the power saving mode and cause the mode of the image processing device to return from the power saving mode. The sub control system controls response/transmission of a network interface and a USB device provided for inputting or outputting of image data.

FIG. 1 is a block diagram showing the hardware composition of a control system of an image processing device in this embodiment. The blocks in the control system of FIG. 1 include the following components.

Figure 3:
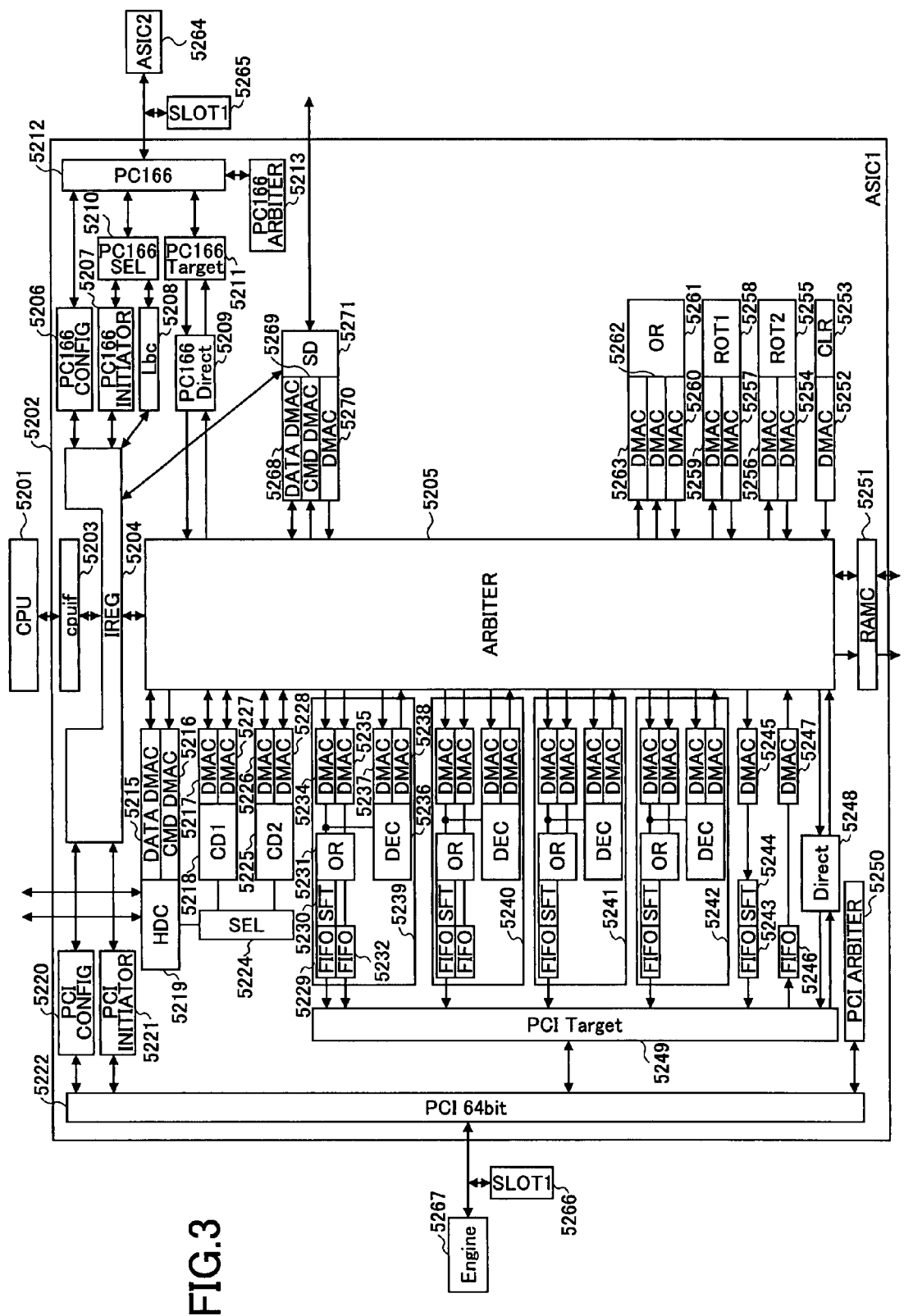
FIG. 3 is a block diagram showing the internal composition of ASIC1 in the control system of FIG. 1.

5401: controller (controller board)
5402: expansion slot board (which is called a mother board; in this example, which has only slots)
5403: engine (scanner engine or printer engine; which is also indicated as the element 5267 in FIG. 3)
5404: CPU (central processing unit; which is also indicated as the element 5201 in FIG. 3)

5405: ASIC1 (which works as an application specific integrated circuit under control of CPU 5404 and constitutes the main control system; which is also indicated as the element 5202 in FIG. 3)

5406: MEM (memory used as the buffer for images, programs and for work areas)

5407: HDD (hard disk drive; which is a storage apparatus which stores images, management information, fonts, programs, etc.; two HDDs connected in parallel may be used in order to raise the data transfer rate)

5408: SD (secure digital card interface; which is provided to allow booting of a program stored in SD card)

5409: LOGIC (logic which generates a local bus signal from a PCI (peripheral component interconnect) signal)

5410: ROM0 (read-only memory which stores programs and is provided to allow booting)

5411: ROM1 (read-only memory which stores programs and is provided to allow booting)

5412: NVRAM (nonvolatile random access memory which stores system setting information)

5413: SLOT1 (option PCI slot 1)

5414: SLOT2 (option PCI Slot 2)

5415: SLOT3 (option PCI Slot 3)

5416: operation panel (independent unit which is built with a CPU and a program and controls screen display and UI (user interface))

5417: ASIC2 (which is connected to ASIC1 (5405) by a PCI bus and works as ASIC which constitutes the sub control system; which is also indicated as the element 5264 in FIG. 3)

5418: SLOT2 (option slot 2 of engine side PCI)

5419: SLOT3 (option slot 1 of engine side PCI)

5420: network I/F (network interface for connecting the image processing device with an external host PC)

5421: USB2.0 (USB2.0 interface for connecting the image processing device with an external host PC)

Next, operation of the control system the hardware composition of which is shown in FIG. 1 will be explained. In the following, the operation is divided into each operation of (1) initialization, (2) changing to the power saving mode, and (3) returning from the power saving mode, and a description of each operation will be given.

(1) Initialization

If the power supply is switched on, each function is initialized by CPU (5404), initialization of the controller (5401) is performed, and engine (5403) is set in a waiting state until it receives a processing request command. The flow of this initialization is carried out when changing the device to the normal operating state.

The initialization of the controller (5401) is based on the following steps. Pressing the power supply switch causes a reset signal to be inputted to ASIC2 (5417). The ASIC2 (5417) which receives this input signal sends a reset signal to the power supply unit (not shown) so that electric power supply to a set of divided power supply groups is turned on in a given sequence.

As a result, the reset signals sent from the power supply groups are distributed to the necessary devices. In the CPU (5404), the reset signal is asserted and negated, and the CPU will fetch the command of a reset vector and sends the fetch signal the ASIC1 (5405). The ASIC1 (5405) decodes the address when the fetch signal is received, and asserts the CS signal of ROM0 (5410) in which the initializing program is stored, so that the contents (the instruction codes/data) at the address of the ROM0 (5410) requested by the CPU (5404) are read out and supplied to the CPU (5404).

The CPU (5404) repeatedly requests the ASIC1 (5405) to read out the instructions, and the ASIC1 (5405) passes the instruction codes/data from the ROM0 (5410) to the CPU (5404) according to the relevant address. Thus, the CPU (5405) can execute the initializing program.

The ASIC1 (5405) has the built-in mechanism which enables reading out of instruction codes/data directly from an SD card in the SD (5408) instead of the ROM0 (5410). In the SD card, a program is stored in the format that is the same as the program stored in the ROM0 (5410). Generally, an SD card is managed by a sector number, but it can be accessed by converting the fetch request address from the CPU (5405) into a sector number and an offset address in the sector, in a manner similar to that of the ROM0.

By the read initializing program, initialization of the CPU (5404), initialization of the memory (5406) which is connected to the ASIC1 (5405), and the ASIC2 (5417), initialization of two PCI buses from the ASIC1 (5405), initialization of the engine (5403), initialization of the operation panel (5416), initialization of the HDD (5407), and initialization of the network I/F are carried out. And if needed, the SLOT groups (5418, 5419, 5413, 5414, 5415) are initialized, and then the application programs are started.

The access time of the ROM0 (5410) of the ASIC1 (5404) is dependent on the data bus width, and in order to reduce the number of external terminals of ASIC1 (5405) as small as possible, and, in many cases, the number of external terminals is set to be smaller than the width of the data bus of the CPU (5404), such as 16 bits, 8 bits, etc. If a 4-bit or 1-bit serial device, SEEPROM, SD card (5408) or a memory stick is used in some case, the access time will become late.

In order to reduce terminals for exclusive use, it is possible to connect the ROM0 (5410), the ROM1 (5411) and the NVRAM (5412) through the exterior LOGIC (5409) to the signals of the PCI, sharing the terminals of the PCI bus. In this case, it is possible to access the ROM0 (5410), the ROM1 (5411) or the NVRAM (5412) exclusively with the access to the PCI bus.

In the composition of this embodiment, the ASIC2 (5417) performs, with the host I/F the return, the control of the power supply and the operation of returning from the power saving mode, while the ASIC1 (5405) performs the control of the CPU (5405), the MEM (5406), the HDD (5407) and the SD (5408) with the two PCI buses.

The optional composition of the two PCI buses of the ASIC1 (5405) can be assigned for setting of REQ/GNT, and this increases the flexibility of the system configuration. One of the two PCI buses is for exclusive use for connection with the engine (5403), and the other is for exclusive use for connection with the ASIC2 (5417). The PCI bus to which the ASIC2 (5417) is connected can be operated at 66 MHz, and it is specializing in order to connect the host I/F. The option slots 1, 2 and 3 (5413, 5414, 5415) are provided so that they may be connected with only the PCI bus connected with the engine at the time of 66 MHz operation.

Similarly, interrupt signals can also be assigned one for the engine (5403), one for the ASIC2 (5417), and the remaining three signals for either of the PCI buses.

—Initialization of CPU

The CPU (MIPS system) (5404) reads out the boot configuration data in each ASIC. Fetch of the command is started after reset release. It is determined whether the initiation is cold reset or other. And initialization of the access timing of the local bus in each ASIC, initialization of the cache in the CPU, initialization of TLB, and setup of exception vector, and initialization of the coprocessor are performed.

—Initialization of Memory

It is checked whether the option memory exists, before determining the parameters concerning the timing of the normally implemented memory (also called standard memory). If the option memory exists, the SEEPROM in which the information on the option memory is stored is accessed, and the capacity of the memory, the speed, and the composition are read out. The standard memory timing is compared with the option memory timing, and the slower timing is selected and it is set to the ASIC1 (5405), and initialization of the MEM (5406) is performed. Then, setting of the interrupt vector table and setting of the initial value to the data area are performed.

—Initialization of PCI Bus

The configuration register in the internal registers of each ASIC is used, and all the devices existing on the PCI bus are searched. The type of each device is determined, and if there is a bus bridge, the devices on the following bus at the point will be searched. If listing of all the devices is completed, mapping of the address space of the PCI is performed. The mapping is performed by setting the start address of the memory under ASIC management to as 0x0000.0000 (making it 0x0000.0000 is not necessarily needed). The mapping of other devices is performed in the PCI memory space access window provided in the register space of the ASIC, or the PCI I/O space access window. If the mapping is completed, the value 1 is set to the memory enabling bit, the I/O enabling bit and the bus master enabling bit of the command register of each device, so that each device is set in the operable state. Since two PCI buses exist in the ASIC1 (5405), both the PCI buses are initialized similarly.

—Initialization of Engine (5403)

Communication between the engine (5403) and the controller (5401) is performed via the transmission buffer and the receive buffer provided in the engine side PCI device.

—Initialization of Operation Panel (5416)

The operation panel (5416) and the ASIC2 (5417) are connected together via the operation panel I/F, and transmission and reception are performed in full duplex. A packet telecommunication is performed with a predetermined packet size, and it is displayed on the operation panel to indicate that the system is initializing.

—Initialization of HDD (5407)

It is checked whether the HDD (5407) is connected, and when the HDD (5407) is connected, the information on the HDD (5407) is read out and management information is stored in the memory in order to use it later.

Figure 2:
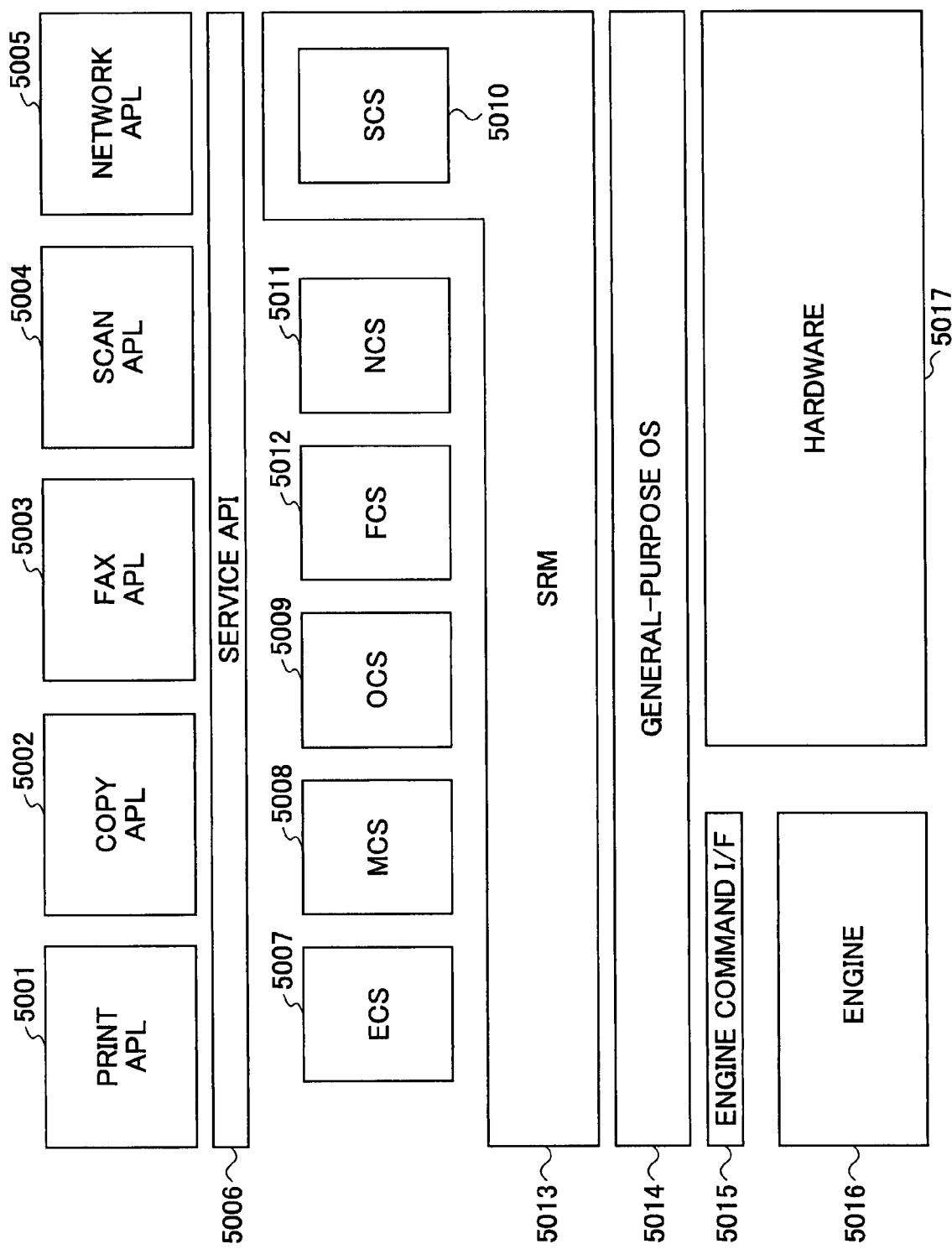
FIG. 2 is a diagram showing the software composition of a main control system of the control system of FIG. 1.

FIG. 2 shows the software composition of the software carried in the main control system of the controller (5401). The blocks in the software composition of FIG. 2 include the following components.

5001: PRINT-APL (print application)
5002: COPY-APL (copy application)
5003: FAX-APL (fax application)
5004: SCAN-APL (scanner application)
5005: NETWORK-APL (network application)
5006: Service API (application programming interface of service layers 5007-5012)
5007: ECS (engine control service)
5008: MCS (memory control service)
5009: OCS (operation panel control service)
5010: SCS (system control service)
5011: NCS (network control service)
5012: FCS (fax control service)
5013: SRM (system resource manager)
5014: general-purpose OS (the OS installed in this example is similar to UNIX (registered trademark))
5015: Engine Command I/F (programming interface for communicating with the engine)
5016: Engine Hardware (main part of the engine)
5017: Controller Hardware (hardware resource of the controller)

As mentioned above, the portions depending on the CPU (5404) or each ASIC are absorbed in the device driver layer (see the composition of the general-purpose OS layer in FIG. 20 below), and this makes it easy to install a different CPU and a different ASIC therein.

FIG. 3 is a block diagram showing the internal composition of ASIC1 in the controller (5401) of FIG. 1. The blocks in the ASIC1 of FIG. 3 include the following components.

5201: CPU (also shown as 5404 in FIG. 1)
5202: ASIC1 (also shown as 5405 in FIG. 1)
5203: CPU I/F (module connecting the CPU (5201) and the ASIC1 (5202))
5204: IREG (internal register)
5205: arbiter (memory arbiter)
5206: PCI66_CONFIG (configuration space of the PCI66 (5212))
5207: PCI66_INITIATER (initiater access module of the PCI66 (5212))
5208: LBC (local bus controller)
5209: PCI66_DIRECT (direct access path of the PCI66 (5212))
5210: PCI66_SEL (selector of the local bus and the PCI66 (5212))
5211: PCI66_Target (target of the PCI66 (5212))
5212: PCI66 (main part of the PCI66)
5213: PCI66_Arbiter (PCI arbiter)
5215: DATA_DMAC (data DMAC (direct memory access controller) of the HDD (5407))
5216: CMD_DMAC (command DMAC of the HDD (5407))
5217: CD1_DMAC1 (image side DMAC of codec 1 for image input/output)
5218: CD1 (codec1)
5219: HDC (HDD controller; 2 sets for RAID)
5220: PCI-CONFIG (configuration space of the PCI)
5221: PCI-INITIATER (initiater access module of the PCI)
5222: PCI (main part of the PCI (64 bits))
5224: SEL (codec selector)
5225: CD2 (codec2)
5226: CD2-DMAC1 (image side DMAC of codec2 for image input/output)
5227: CD1-DMAC2 (code side DMAC of codec1 for code input/output)
5228: CD2-DMAC2 (code side DMAC of codec2 for code input/output)
5229: FIFO (FIFO for video1 output)
5230: SFT (video1 image shifter)
5231: OR (video1 image composition unit)
5232: FIFO (FIFO for video1 composite-frame output)
5234: DMAC (DMAC for video1 output)
5235: DMAC (DMAC for video1 composite-frame output)
5236: DEC (decoder for video1)
5237: DMAC (DMAC for video1 decoder code input)
5238: DMAC (DMAC for video1 decoder image output)
5239: VOUT1 (video 1 module)
5240: VOUT2 (video 2 module)
5241: VOUT3 (video 3 module)
5242: VOUT4 (video 4 module)
5243: FIFO (FIFO for separated signal output)
5244: SFT (shifter for separated signal)
5245: DMAC (DMAC for separated signal output)
5246: FIFO (FIFO for image input)

5247: DMAC (DMAC for image input)
5248: DIRECT (PCI direct access path)
5249: PCI_Target (PCI target module)
5250: PCI_Arbiter (PCI arbiter)
5251: RAMC (RAM memory controller)
5252: DMAC (DMAC for clear)
5253: CLR (module for clear)
5254: DMAC (write DMAC for rotation unit 2)
5255: ROT2 (rotation unit 2)
5256: DMAC (read DMAC for rotation unit 2)
5257: DMAC (write DMAC for rotation unit 1)
5258: ROT1 (rotation unit 1)
5259: DMAC (read DMAC for rotation unit 1)
5260: DMAC (write DMAC for composition)
5261: OR (composition module)
5262: DMAC (read DMAC1 for composition)
5263: DMAC (read DMAC2 for composition)
5264: ASIC2 (ASIC for I/O; also shown as 5417 in FIG. 1)
5265: SLOT1 (option slot for PCI66)
5266: SLOT1 (option slot for PCI)
5267: ENGINE (scanner/plotter engine)
5268: DATA_DMAC (data DMAC for SD)
5269: CMD_DMAC (command DMAC for SD)
5270: DMAC (data DMAC for SD I/O)
5271: SD (SD control module)

FIG. 4 shows the memory map of ASIC1 (which is also indicated as 5405 in FIG. 1). In the memory map in the table of FIG. 4, the "address" and the "size" (of major classification), the "major classification" (classified according to the kind of memory space), the "size" (subdivision size), and the "detail" (details of major classification) are described sequentially from the left column of the table.

Figure 5:
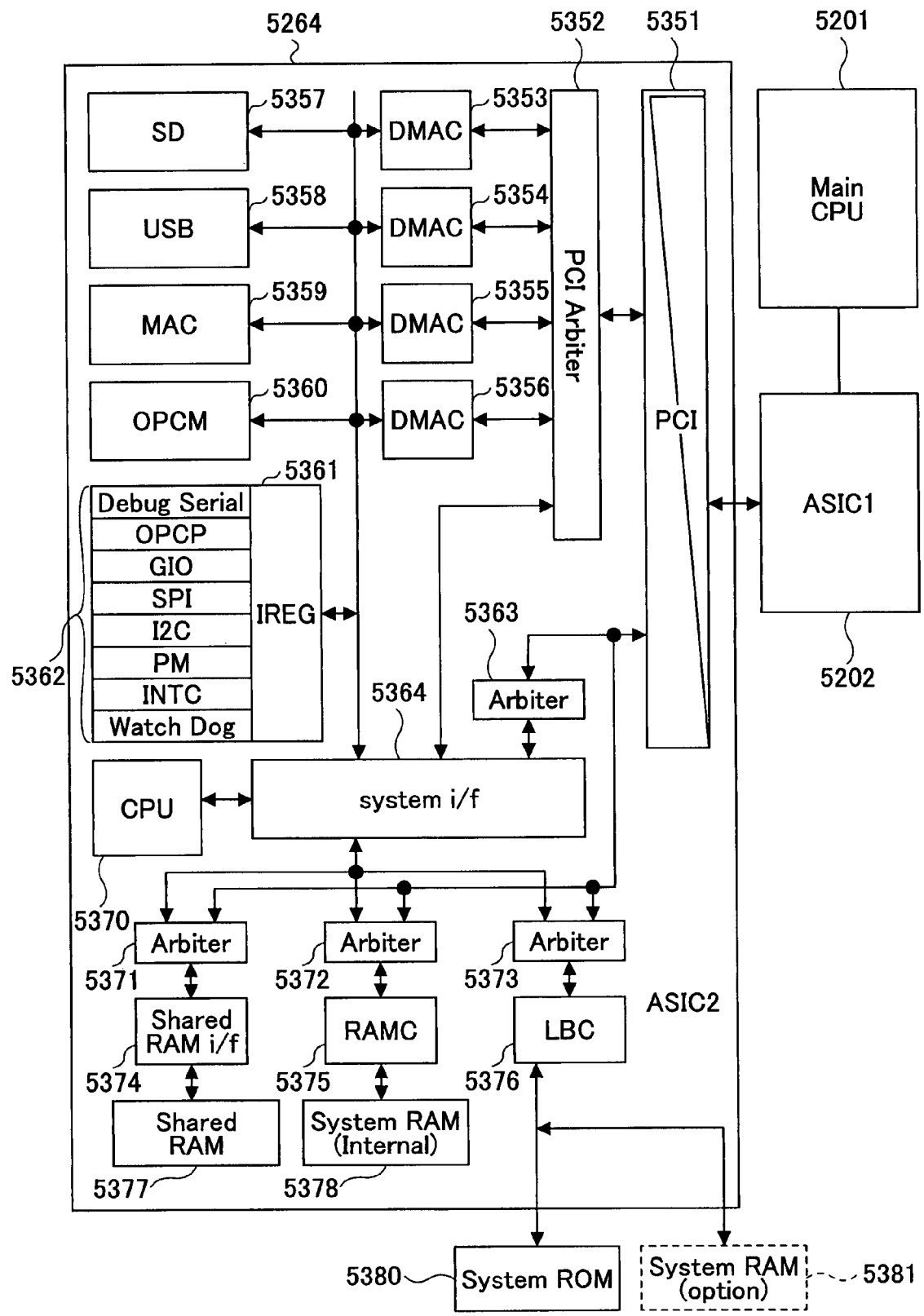
FIG. 5 is a block diagram showing the internal composition of ASIC2 in the control system of FIG. 1.

FIG. 5 shows the internal composition of ASIC2 in the controller (5401) of FIG. 1. The blocks in the ASIC1 of FIG. 5 include the following components.

5264: ASIC2 (ASIC for I/O; also indicated as the element 5417 in FIG. 1) 5351: PCI (PCI bus control unit which is connected to the ASIC1 (5202))
    5352: PCI_Arbiter (PCI arbiter)
    5353: DMAC (DMAC for SD)
    5354: DMAC (DMAC for USB)
    5355: DMAC (DMAC for MAC)
    5356: DMAC (DMAC for OPCM)
    5357: SD (control unit for SD)
    5358: USB (control unit for USB)
    5359: MAC (memory control unit)
    5360: OPCM (copy operation unit I/F control unit)
    5361: IREG (internal register)
    5362: Debug_Serial (control unit for each of OPCP (printer operation unit I/F), GIO (general-purpose IO ports), SPI (SPI control register), 12C (12C control register), PM (power management unit), INTC (interruption control unit), and WatchDog)
    5363, 5371, 5372, 5373: Arbiters (internal bus arbiters)
    5364: System_i/f (interface of the control system formed with the CPU (5370))
    5370: CPU (processor controlling the whole ASIC2 (5264))
    5374: Shared_RAM_i/f (interface to the shared RAM (5377))
    5375: RAMC (control unit of System_RAM (5378))
    5376: LBC (control unit of external System_MEM)
    5377: Shared_RAM (shared_RAM in the ASIC2)
    5378: System_RAM (system_RAM in the ASIC2)
    5380: System_ROM (system_ROM outside the ASIC2)
    5381: System_RAM (system_RAM outside the ASIC2 which is used as option)

The ASIC2 (5264) which constitutes the sub control system (ASIC for I/O) as in the embodiment of FIG. 5 has the CPU (5370). That is, by providing the CPU therein, flexibility is given to the control system and the functions which suit the sub control system which manages the control power supply at the time of the power saving mode can be easily realized. On the other hand, it is also possible to configure the sub control system by a hardware configuration.

Figure 6:
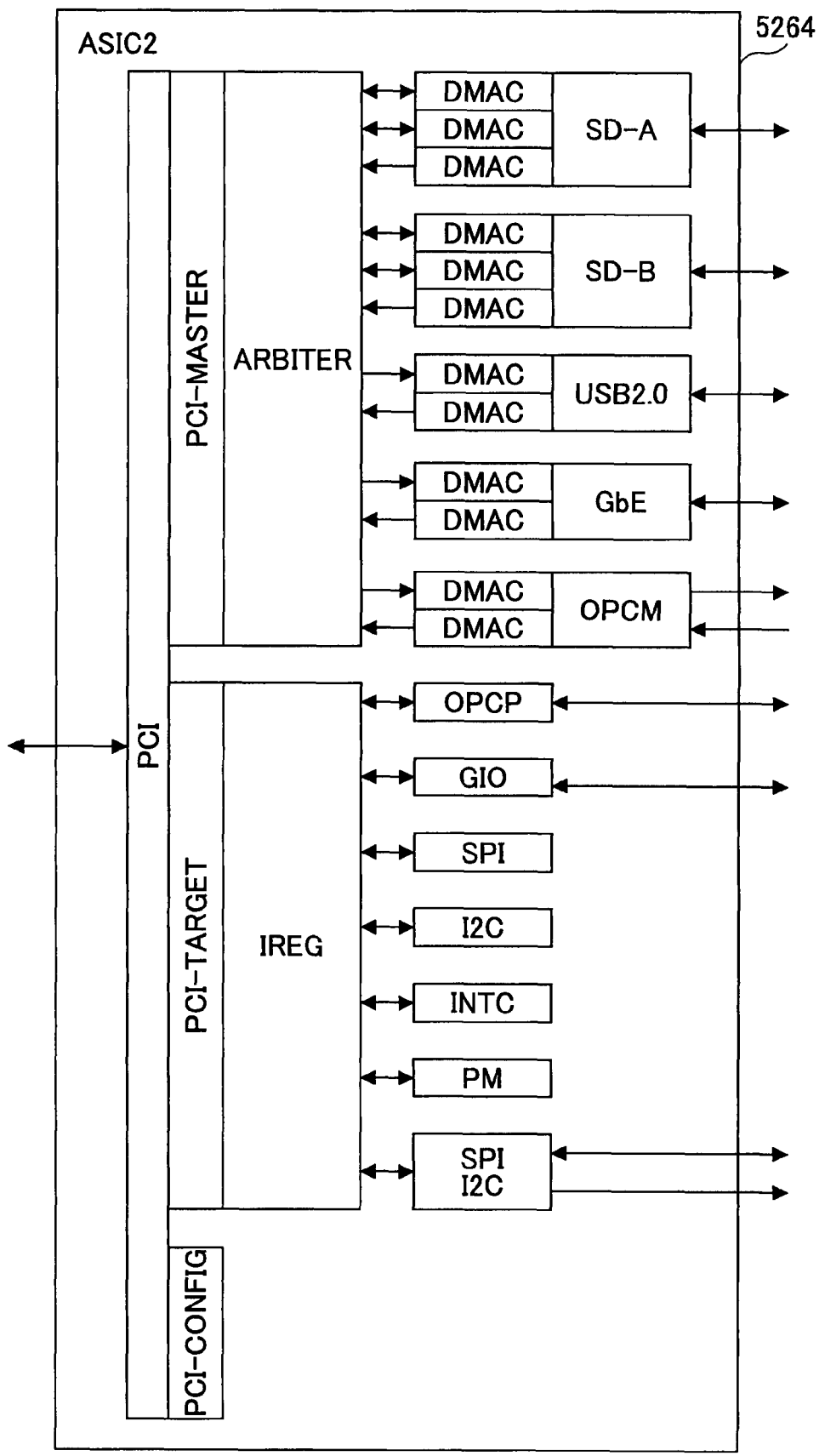
FIG. 6 is a block diagram showing another example of the internal composition of ASIC2 in the control system of FIG. 1.

FIG. 6 shows another example of the hardware composition of ASIC2 (ASIC for I/O) which constitutes the sub control system. The ASIC2 (5264) in FIG. 6 is equivalent to the ASIC2 (5417) in the control system of FIG. 1.

Also in the composition of FIG. 6 in which no CPU is provided, the function of the ASIC for I/O is the same as that of the composition of FIG. 5 in which the CPU is provided, and implementing this embodiment is possible. However, since there are the problems, such as increase of circuit size and less flexible system, according to the composition without CPU (FIG. 6), only the illustration of this composition is given. And a detailed description of an embodiment of the sub control system, which controls the power supply at the time of the power saving mode will be given below based on the composition with CPU (FIG. 5).

(2) Changing to Power Saving Mode

When the initialization of various devices is completed, the general-purpose OS (5014) initiates the application programs based on the configuration information of the system. If the facsimile unit as an option is not provided, the fax application (5003) is not initiated.

When the application programs are initiated, the default operation screen of the copy application is displayed on the operation panel (5416), and the MFP is in a waiting state for receiving user instructions. The initial operation screen displayed at this time can be changed to a desired one of the application programs by setting it by the user.

Subsequently, in response to the processing request instructions inputted by the user on the operation panel, the normal processing is performed using the relevant ones of various kinds of the application programs. Usually, if a predetermined mode change condition is met in the normal processing mode, the mode of the MFP is changed to the power saving mode. Then, if a predetermined return condition is met in the power saving mode, the mode of the MFP is again returned to the normal operation mode.

Figure 7:
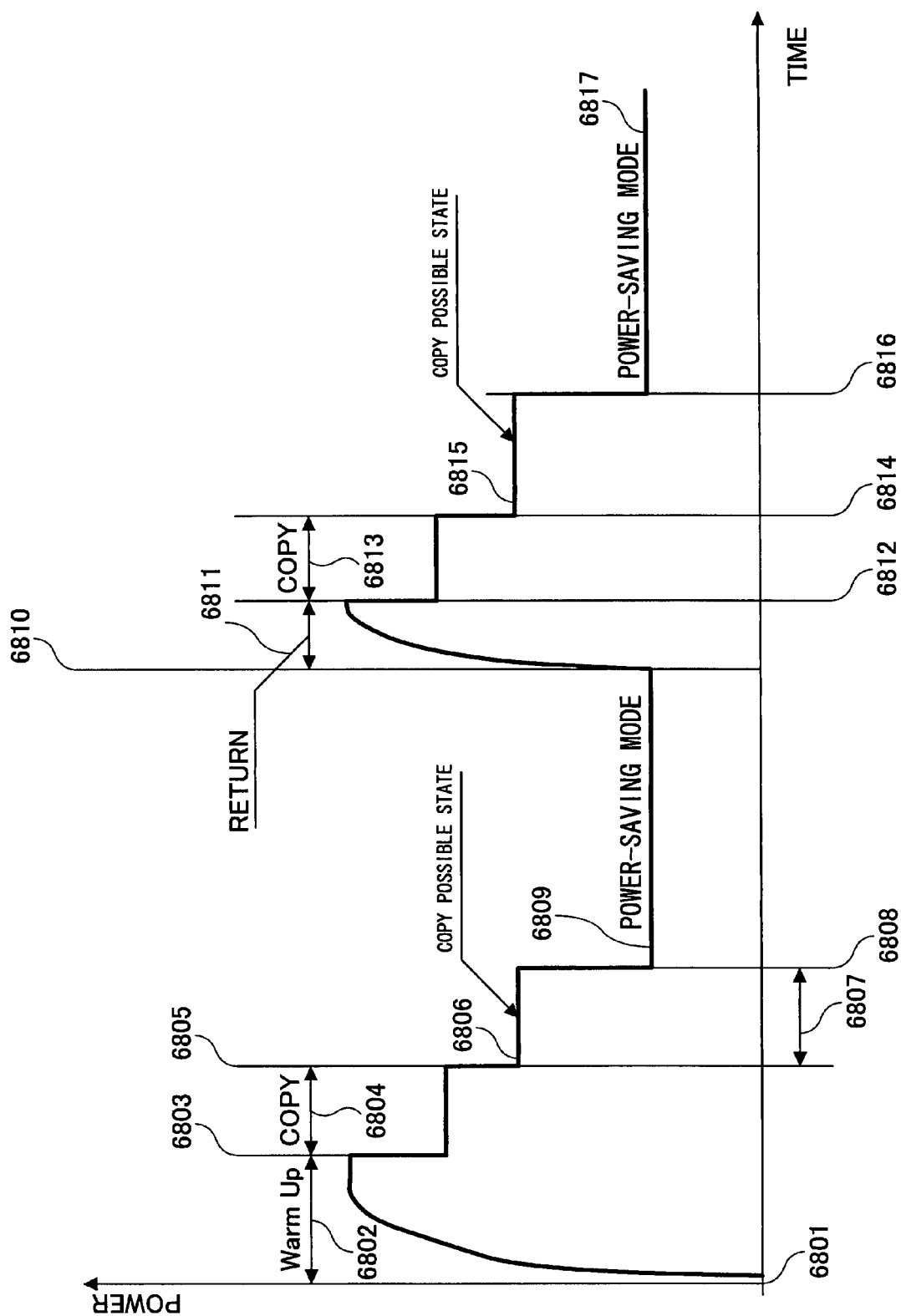
FIG. 7 is a diagram showing the state transition of electric power of the main power supply in which it changes from ON state to the power saving mode and returns to the normal operating mode from the power saving mode.

FIG. 7 shows the state transition in such a time. Hereafter, operation will be explained using the state transition diagram of FIG. 7. Shown in FIG. 7 is an example of the operation of the MFP in which the copy function is used.

As shown in FIG. 7, after ON state of the main power supply (6801), the controller (5401) is set in an engine ready state through the initialization process which includes the initialization of CPU (5404) and the initialization of ASIC1 (5405) and ASIC2 (5417) as mentioned above. Through the initialization process including the initialization of CPU (5404) and each ASIC, the engine (5403) communicates with the controller (5401) and notifies that the fixing unit (not shown) is warming up (6802). The engine (5403) at this time tends to consume the electric power much more than the normal electric power to start the fixing unit as quickly as possible until the fixing unit is set at a constant temperature.

After the fixing unit is set at the target temperature, the control is changed so that the temperature of the fixing unit is kept constant using the normal electric power. After the engine is set in the ready state, the copy operation (6803) is started in response to the instructions of the user. The fixed electric power is consumed during the copy operation (6804).

Simultaneously with the completion (6805) of the copy operation, the MFP is set in the copy-possible state (6806). If the user does not access the MFP in this state for the fixed time (6807), the timeout of the watchdog timer for changing to the power saving mode occurs (6808) and the mode of the MFP is changed to the power saving mode (6809). In the power saving mode (6809), the power supply to the MFP is turned off, except for the portion having the monitoring function to check if the return condition is met, so that the power dissipation is reduced to the low level.

A return trigger (6810) is sent out when the user performs pressing of the return key for returning from the power saving mode, setting of a document onto the ADF (automatic document feeder) in order to perform a copy operation, or lifting of the ADF (to remove the ADF for starting the pressure plate reading), or when the return instruction is received from the network. Then the return operation (6811) is started.

In the return operation (6811), the engine tends to consume the electric power much more than the normal electric power in order to raise the temperature of the fixing unit as quickly as possible. In the return operation, the CPU (5404) is set in the state waiting for the engine ready through the initialization process including the initialization of each ASIC. Through the initialization process including the initialization of CPU (5404) and each ASIC, the engine (5403) communicates with the controller (5401) and notifies that the fixing unit (not shown) is warming up and set under the return operation (6811). The engine (5403) at this time tends to consume the electric power more than the normal electric power in order to start the fixing unit as quickly as possible until the fixing unit is set at the constant temperature.

After the fixing unit is set at the target temperature, the control is changed and the temperature of the fixing unit is kept constant by using the normal electric power. After the engine is set in this ready state, the copy operation is started in response to the instructions of the user (6812). The fixed electric power is consumed during the copy operation (6813). Simultaneously with the completion (6814) of the copy operation, the MFP is set in the copy-possible state (6815). If the user does not access the MFP for the fixed time, the timeout (6816) of the watchdog timer for changing to the power saving mode occurs. And the mode of the MFP is changed to the power saving mode (6817).

In the state transition mentioned above, the initialization process of the controller (5401) is usually performed at the time of starting from the main power supply ON (6801) to the normal processing state and at the time of returning from the power saving mode to the normal processing state. A description will be given later of the initialization processing which is performed at this time.

The starting time of the application programs and the general-purpose OS (5014) of the controller (5401) depends on the access time of the program ROM (in this example, the ROM0 (5010) and the ROM1 (5411) are used). It is necessary to store the programs in the non-compressed state in order to initiate the programs in the access time of the ROM. The amount of storage information of the non-compressed programs is increased several times as large as that of the compressed programs, and there is the problem that the cost becomes high.

It is desirable that both the time for starting from the main power supply ON and the time for returning from the power saving mode are very short. However, there are various restrictions, and, actually, the setting of the program ROM must be performed to have the conditioning which shortens the time for returning from the power saving mode more than the time for starting from the main power supply ON.

The program ROM is connected to the ASIC1 (5405), and in order to reduce the number of terminals of the ASIC, the width of the data bus for accessing the program ROM is set to be smaller than the width of the data bus of the CPU (5404).

Usually, the command from the ROM is executed upon ON state of the main power supply, and it is copied to the RAM (in this example, the memory 5406 is used) in the midst of execution of the command. If the storage capacity of the RAM is enough, all the programs of the ROM are copied to the RAM. If there is little storage capacity of the RAM, the program portion which must surely be performed is copied at high speed to the RAM, and it is performed. For this reason, it takes too much time to copy the codes of the ROM to the RAM at the time of booting.

Figure 9:
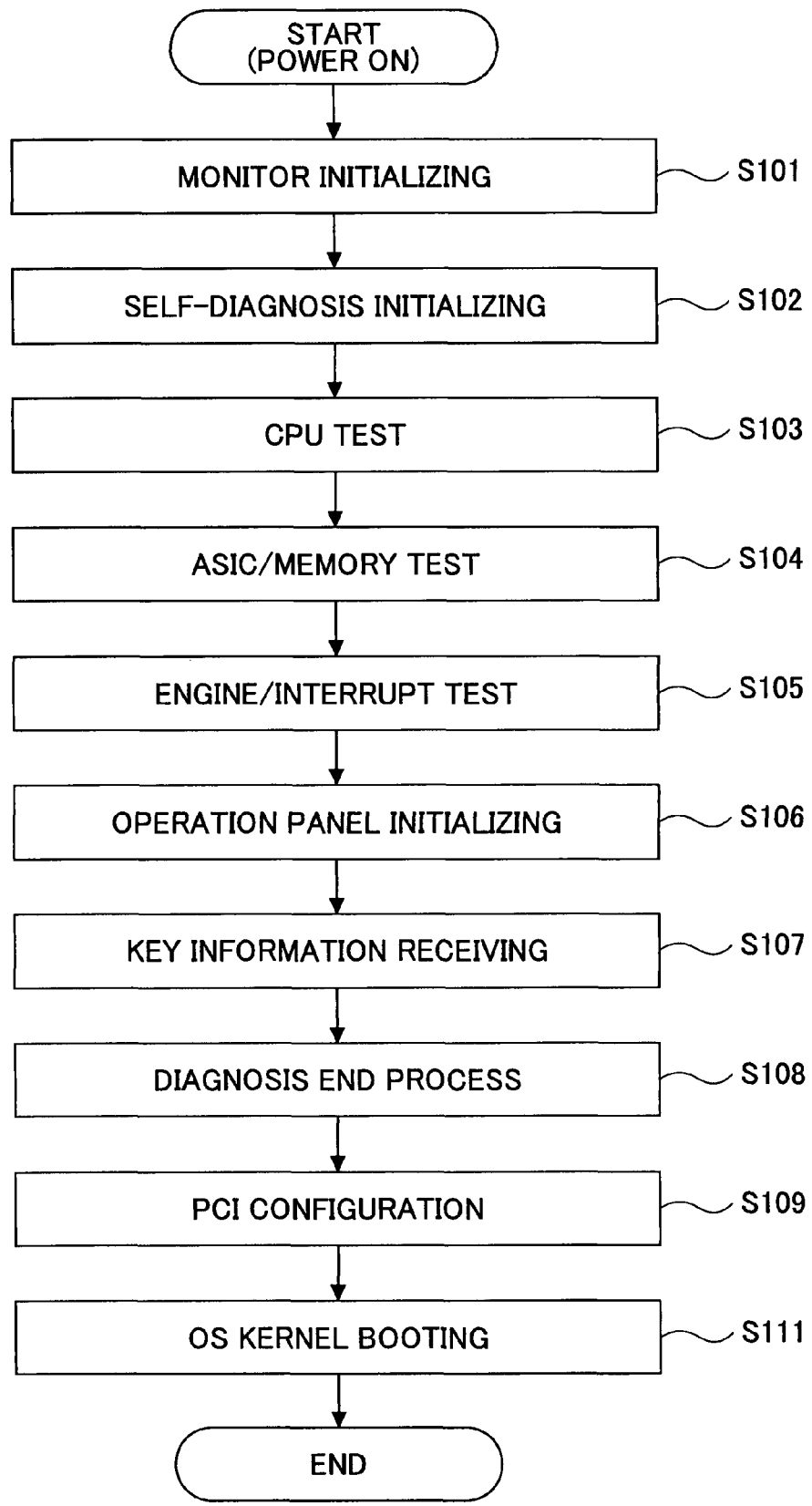
FIG. 9 is a flowchart for explaining the boot processing of the program when it is not developed to RAM.

FIG. 9 shows a boot processing in which the program ROM is accessed on the above conditions and booting of the programs is performed without being developed to the RAM.

As shown in FIG. 9, the boot processing is started with ON state of the power supply and ended with booting of the OS kernel. During the time of the boot processing, each program of a monitor initialization (step S101), a self-diagnosis initialization (step S102), a CPU test (step S103), an ASIC/memory test (step S104), an engine/interrupt test (step S105), an operation panel initialization (step S106), a KEY information receiving (step S107), a diagnosis end process (step S108), a PCI configuration (step S109), and an OS kernel booting (step S111) is performed.

Figure 10:
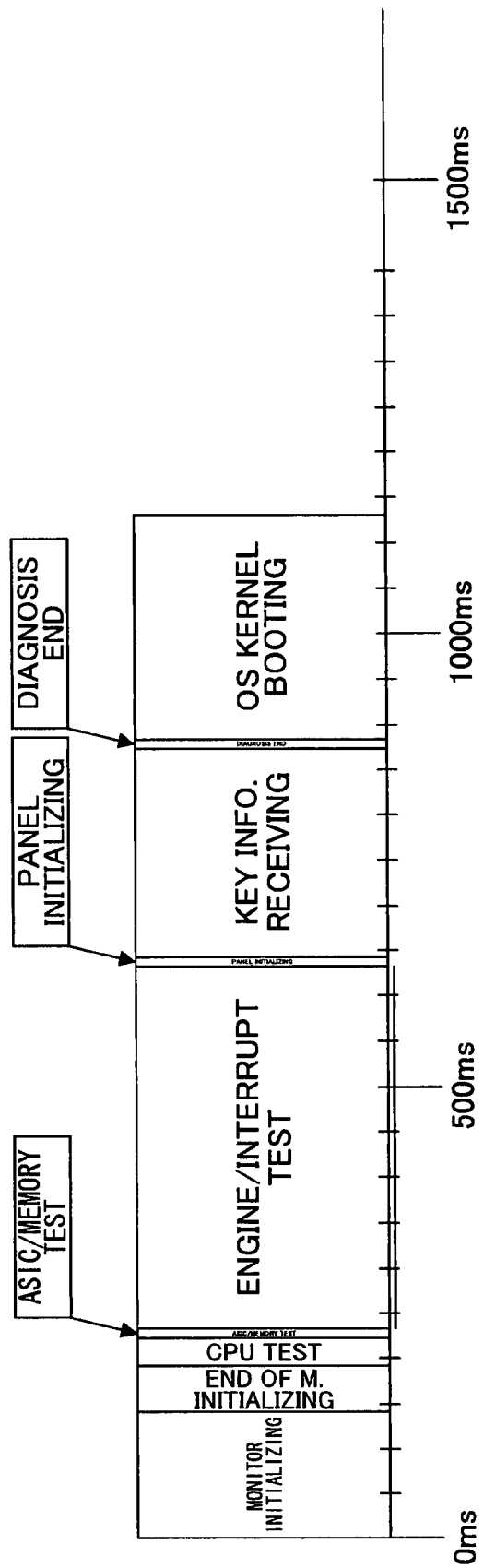
FIG. 10 is a diagram showing the allocation of the time needed to perform respective processing steps when the boot processing of FIG. 9 is performed.

FIG. 10 shows the allocation of the time needed to perform respective processing steps when the boot processing of FIG. 9 is performed. In FIG. 10, the horizontal axis is set to the time axis (unit: ms). The time needed to perform each boot processing step is shown. The boot processing is started with the "monitor initialization" at 0 ms and is ended with the "OS kernel booting".

Although the boot processing steps up to the OS kernel booting are explained, loading of the drivers and loading of the application programs are needed after the OS kernel booting, so that copying of the MFP and printing of the printer may be performed.

Figure 11:
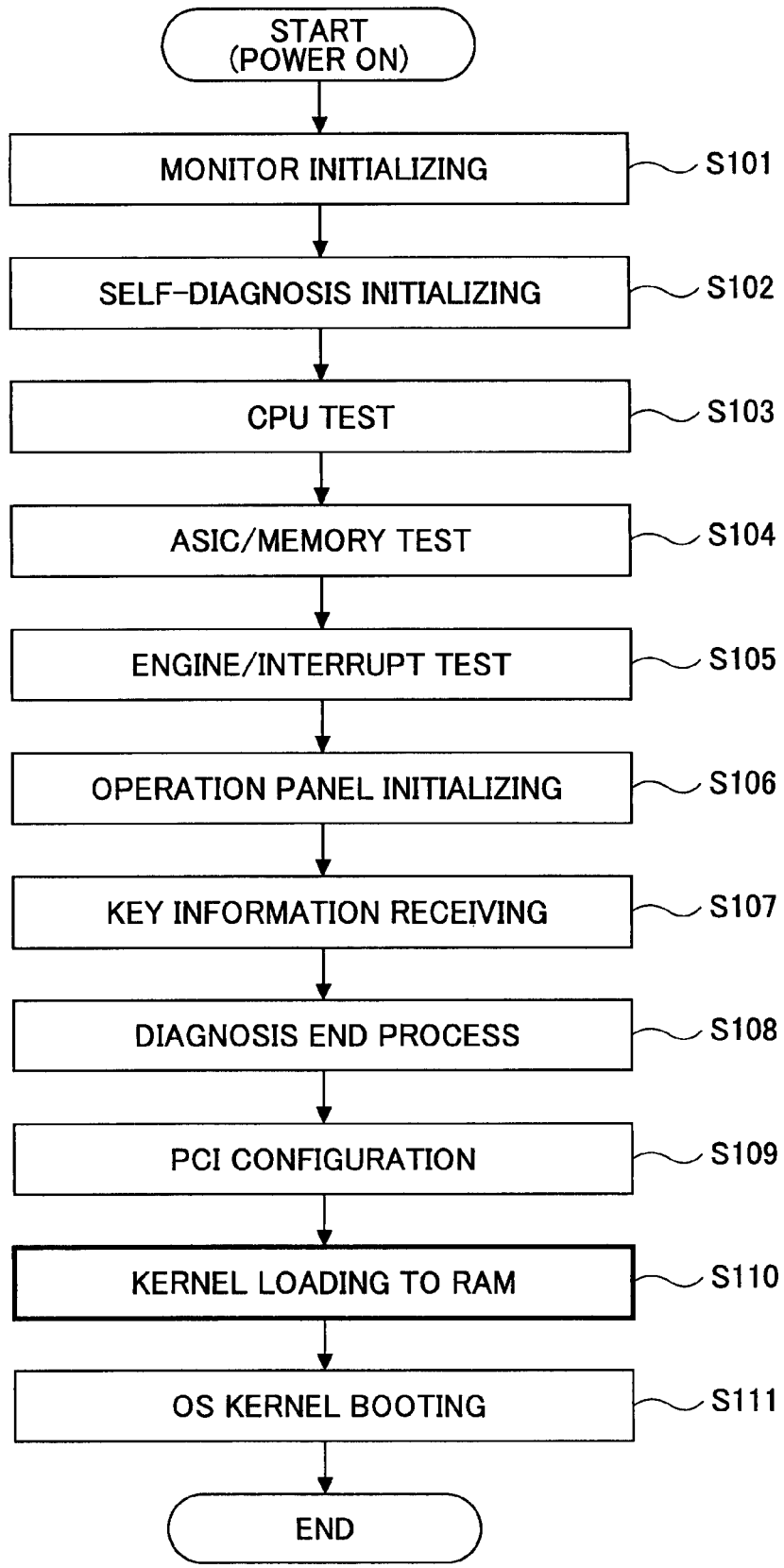
FIG. 11 is a flowchart for explaining the boot processing of the program when it is developed to RAM.

In the above boot processing, the programs are not developed to the RAM. FIG. 11 shows the boot processing in which the ROM wherein the compressed program is stored is accessed and the program is developed to the RAM at the time of booting. Although the boot processing shown in FIG. 11 is essentially the same as that shown in FIG. 9, an additional step of the OS kernel loading (developing) to RAM (step S110) is provided between the PCI configuration (step S109) and the OS kernel booting (step S111). Other steps than the step S110 are essentially the same as the corresponding steps in FIG. 9.

Therefore, the time needed for the boot processing in this case is longer than that in the previous case by the time needed for the loading (developing) of the compressed program from the ROM to the RAM.

Figure 12:
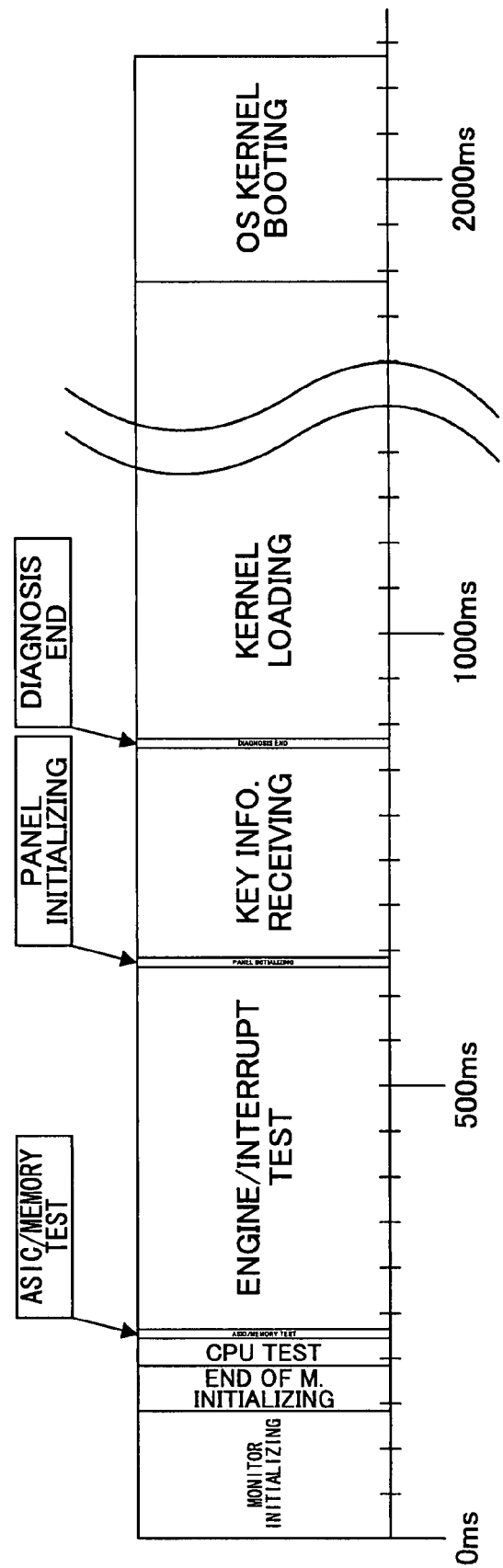
FIG. 12 is a diagram showing the allocation of the time needed to perform respective processing steps when the boot processing of FIG. 11 is performed.

FIG. 12 shows the allocation of the time needed to perform respective boot processing steps when the boot processing of FIG. 11 is performed. As shown in FIG. 12, it is longer than the time for the previous case (see FIG. 10) in which the programs is not developed to the RAM, by the time needed for the kernel loading. Usually, the time to load the portion of the kernel from the ROM to the RAM ranges from 1 second to 4 seconds. Similarly, if the loading of the drivers or the loading of the application programs to the RAM is performed, the time needed will be increased further.

For this reason, even in the case where the program is developed to the RAM at the time of booting by the ON state of the power switch, the codes developed on the RAM remain in the stored condition when changing to the power saving mode (which is called Suspend to RAM). If it is performed so, the codes stored in the RAM are executed directly when returning from the power saving mode. The developing time can be saved, the system can be started in a very short time, and it is possible that the MFP having the copy and printer functions is set in "copy possible" and "print possible" state very speedily.

(3) Returning from Power Saving Mode

Figure 8:
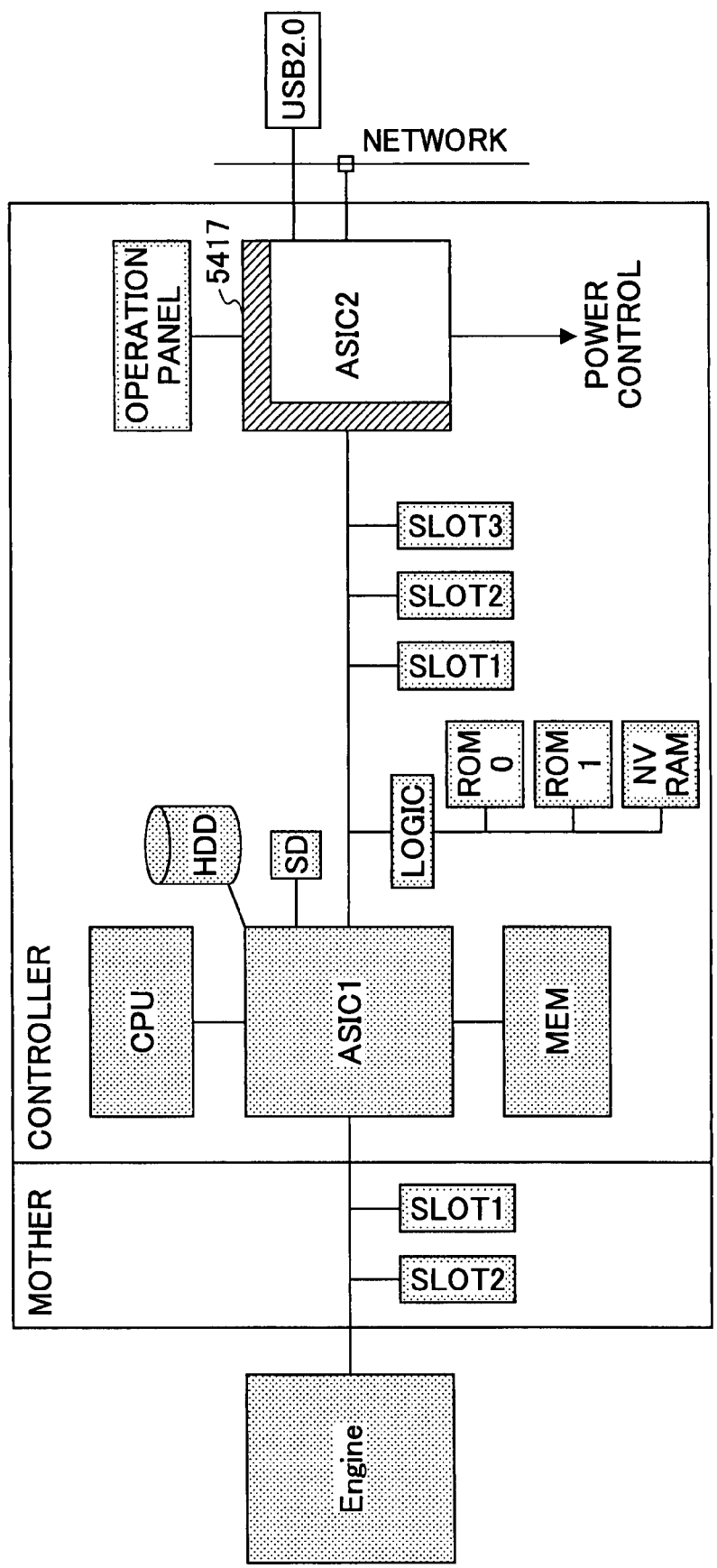
FIG. 8 is a diagram showing the state of the control system in which the power supply is turned off in the power saving mode.

The ASIC2 (5417) which is the sub control system which manages the power supply control performs the control of returning from the power saving mode. FIG. 8 shows the state of the control system in which the power supply is turned off in the power saving mode. As shown in FIG. 8, the power supply to the half-tone dotted portions is still ON (active) at the time of the power saving mode. Namely, at the time of the power saving mode, the power supply to other portions of the controller, except the power supply control unit and the response/monitoring unit to external inputs (for example, a user input operation and an input from the I/F for connecting the external device), is in OFF state.

Therefore, the power supply control unit and the response/monitoring unit to the external inputs (the control units which must be provided in the ASIC2 (5417) (see FIG. 5) as the sub control system) are maintained at the active state even in the power saving mode.

The ASIC2 (5264) (which is also indicated as ASIC2 (5417) in FIG. 1) shown in FIG. 5 has the CPU (5370) provided therein, and it is controlled by the software (this software system will be mentioned as "sub-system"). The sub-system is realized by tasks on the built-in OS, such as iTron. The respective tasks carry out the control by communicating with each other by messages and communicating with the main system via the communication driver.

Figure 13:
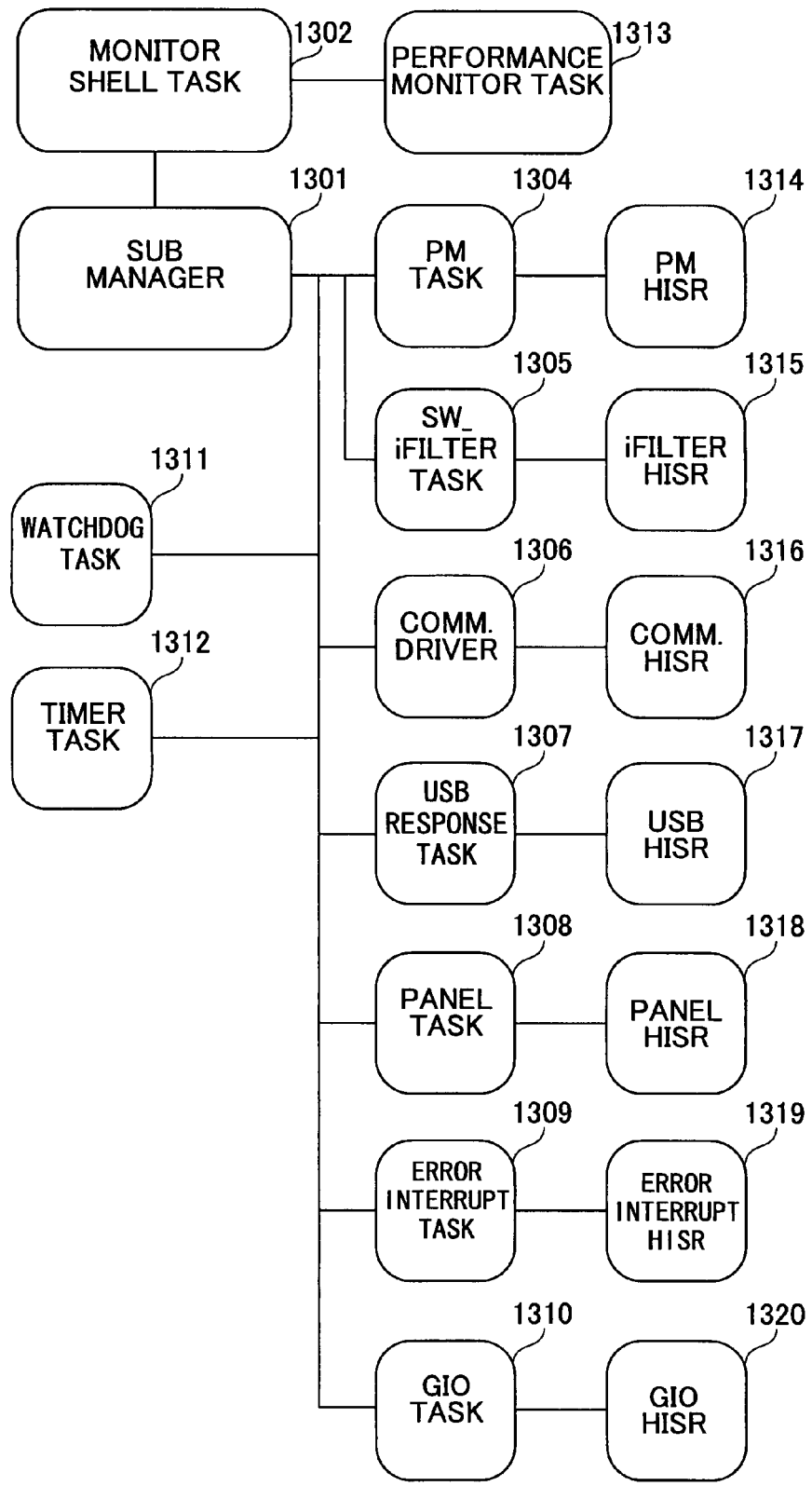
FIG. 13 is a diagram showing the software composition of the sub-system (ASIC2) in the control system of FIG. 1.

FIG. 13 shows the internal composition of the sub-system in this embodiment. The blocks in the software composition of FIG. 13 include the following components.

1301: Sub-manager
1302: Monitor Shell Task
1304: PM Task (power management task)
1305: SW_iFilter Task (network task)
1306: Communication Driver
1307: USB Response Task
1308: Panel Task
1309: Error Interrupt Task
1310: GIO (general-purpose IO port) Task
1311: Watchdog Task
1312: Timer Task
1313: Performance Monitor Task
1314: PM HISR (power management high-level interrupt service routine)
1315: iFilter (network) HISR
1316: Communication HISR
1317: USB_HISR
1318: Panel HISR
1319: Error Interrupt HISR
1320: GIO (general-purpose IO port) HISR In addition, each HISR (high interrupt service routine) of the above-mentioned PM, iFilter, communication, USB, panel, error interrupt, and GIO is a routine which controls the hardware of the relevant task, respectively.

An example of the operation of the power saving mode which is performed by the sub-system (FIG. 13) having the above-mentioned composition will be explained.

Each task is initialized after the sub-system is started by the power-on state of the whole MFP. Since the sub-system is in the conduction (active) state even at the time of the power saving mode, it operates continuously. Each task monitors the corresponding portion (including the external peripheral device) of the ASIC at the time of the power saving mode, and when the monitored result satisfies the return conditions, the MFP can return from the power saving state through the control of the PM (power management).

For example, the GIO which is the general-purpose IO port is constituted as the hardware which may receive in the power saving state the detection signals, such as key detection of the operation panel and detection of the pressure plate setting action in the scanner of the MFP. The GIO task (1310) detects changes of these lines in the power saving state, and monitors changes of the state.

FIG. 14 shows the state transition table of the GIO task (1310). In the state transition table of FIG. 14, "events" occurring along with transition of time in the vertical up-to-down direction are described in the left column, corresponding "states" for the time along with transition of time in the horizontal left-to-right direction are described in the upper column, and "operations", such as transmission of a message of the task, are described at the intersecting portions in the matrix.

That is, the state transition table shows that the task detects the event occurring in the sub-system by receiving the message from each portion (in this example, it is mainly the message from the sub-manager task (1301)), which causes a state transition to occur, and the task operates to transmit a message in connection with the state transition.

In FIG. 14, the GIO task (1310) receives the message from the sub-manager task (1301) and the MFP is set in the power saving mode. After that, when interruption from the GIO port which is a return factor is detected in the power saving state, the GIO task (1310) transmits a return factor detection message to the sub-manager task (1301).

Detection of the return factor during the power saving mode is performed not only by the GIO task (1310) but also by each task which supervises the USB response task (1307), the panel task (1308), the timer task (1312), the SW_iFilter (network) task (1305), the error interruption task (1309), etc. The USB response task (1307) will be described later with reference to FIG. 20.

FIG. 15 shows the state transition table of the sub-manager task (1301). The sub-manager task (1301) is a task which mainly controls the sub-system, and the state transition of the whole sub-system is shown in the state transition table of FIG. 15.

As shown in FIG. 15, after the sub-system is started, it changes to the power saving mode through the normal operation in which the image input/output processing is performed by the main control system. Then, it is set in the "state 4" during the power saving mode by control of the sub-system. The return factor detection message (the above-mentioned message in FIG. 14) sent from the GIO task (1310) is received in the "state 4". The sub-manager task (1301) transmits the message of "main return preparation request" to each task in order to make the state change to the "state 5" of main return. Then, in the "state 5", the message of main return execution request is transmitted. At this time, the power management unit of the ASIC2 (5264) (which is also indicated as ASIC2 (5417) in FIG. 1) is operated by the PM (power management) task (1304), so that the ASIC1 (5202) (which is also indicated as ASIC1 (5405) in FIG. 1) which is the main control system is returned.

FIG. 16 shows the state transition table of the PM (power management) task (1304).

As shown in FIG. 16, the PM (power management) task (1304) operates the registers (the PM (5362) and the IREG (5361) in FIG. 5) of the power management unit when the main return execution request is received, so that a power-saving return sequence is created. In this embodiment, the hardware which receives the request from the main system performs the sequence of changing to the power saving mode.

In the "state 4" during the power saving mode under the control of the sub-system in FIG. 16, the message of main return preparation request transmitted from the sub-manager task (1301) is received. After it is set in the "state 5", the main return execution request message (refer to FIG. 15) transmitted again is received, so that the return processing of the main control system is performed by the PM (power management) task (1304).

In the above embodiment, the operation of the sub-system has been described with the state transition of the related task by giving attention to the return operation from the power saving mode. In the following, the main control system and the sub-system are associated and the sequence of change/return processing of the power saving mode will be explained.

Figure 18:
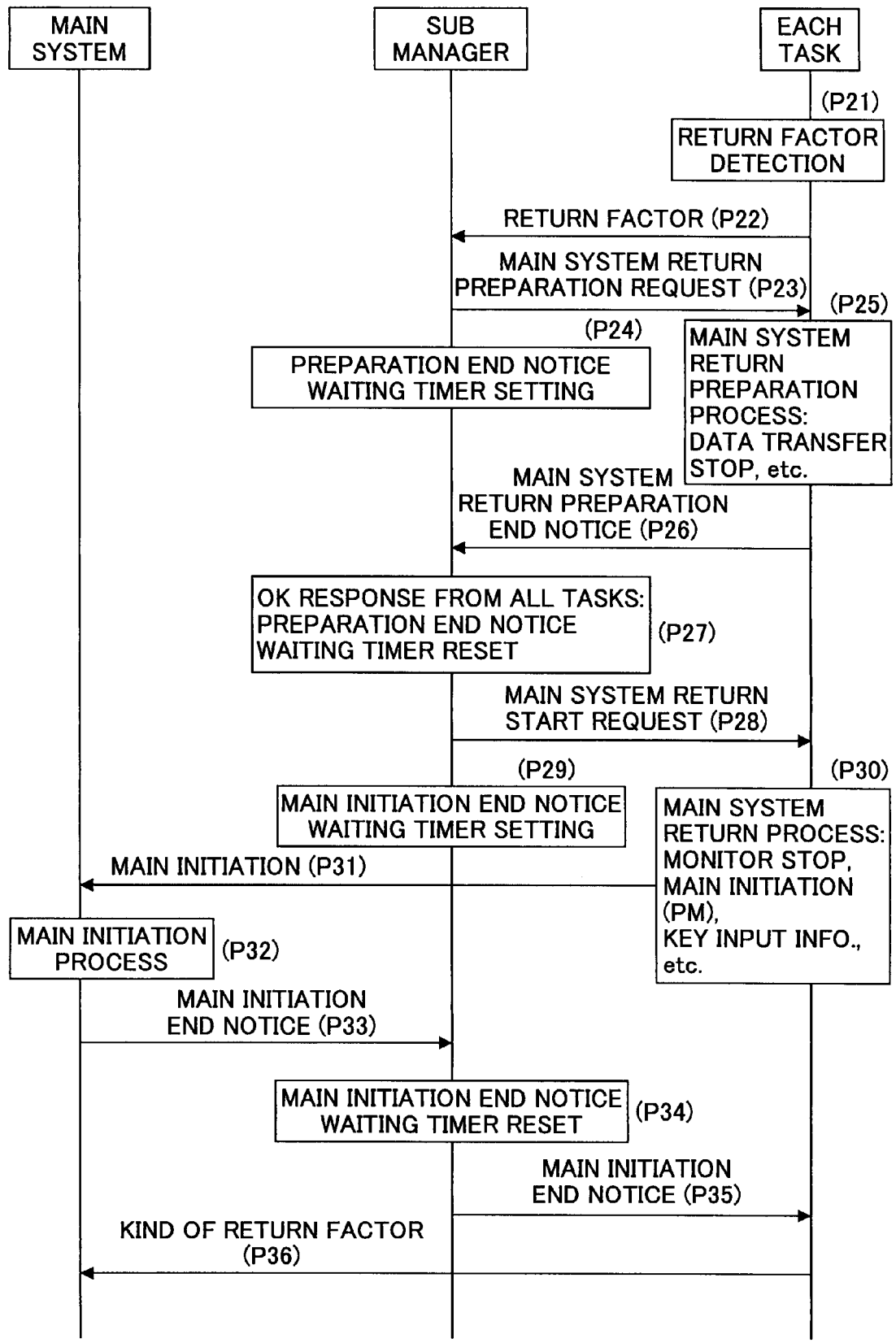
FIG. 18 is a diagram showing an example of the return sequence from the power saving mode of the control system of FIG. 1.

FIG. 17 shows an example of the change sequence and FIG. 18 shows an example of the return sequence. In each sequence of FIG. 17 and FIG. 18, the transmission and reception of messages performed between the respective tasks of the main system in which the power supply is controlled at the time of the power saving mode, and the sub-system which controls change/return operation of the power saving mode, and the sequence of the processing steps performed within each system part.

In the change sequence of FIG. 17, the respective steps are referred to as P1-P15, while in the return sequence of FIG. 18, the respective steps are referred to as P21-P36. The sequence of the processing steps is performed according to numerical order of the steps. In FIG. 17 and FIG. 18, the transmission and reception of messages performed between the respective parts correspond to the operations shown in the above-mentioned state transition table of the sub-manager (FIG. 15), the above-mentioned state transition table of the GIO task (FIG. 14), and the above-mentioned state transition table of the PM (power management) task (FIG. 16).

The processing performed in each relevant part in the change sequence of FIG. 17 includes the "shift preparation processing" (P6) and the "change execution operation" (P15) performed by each task in response to the request from the sub-manager, the "change processing" (P10) performed by the main control system before requesting the sub-manager to perform the change execution processing, and the management processing (P5, P8, P11, P13) performed by the sub-manager using the timer.

The processing performed in each relevant part in the return sequence of FIG. 18 includes the "return factor detection" (P21) of each task, the "main return preparation processing" (P25) and the "main return processing" (P30) performed by each task in response to the request from the sub-manager, the "main starting processing" (P32) performed by the main control system according to the instructions from the PM task, and the management processing (P24, P27, P29, P34) performed by the sub-manager using the timer.

In the above-mentioned sequence, the PM task is operated by the return factor detection by the GIO task, so that the operation of returning from the power saving mode is performed. Similar to the GIO task, the processing corresponding to each return factor can be performed by preparing the task which detects each hardware unit. In the following, the return factor is detected by the panel task.

Figure 19:
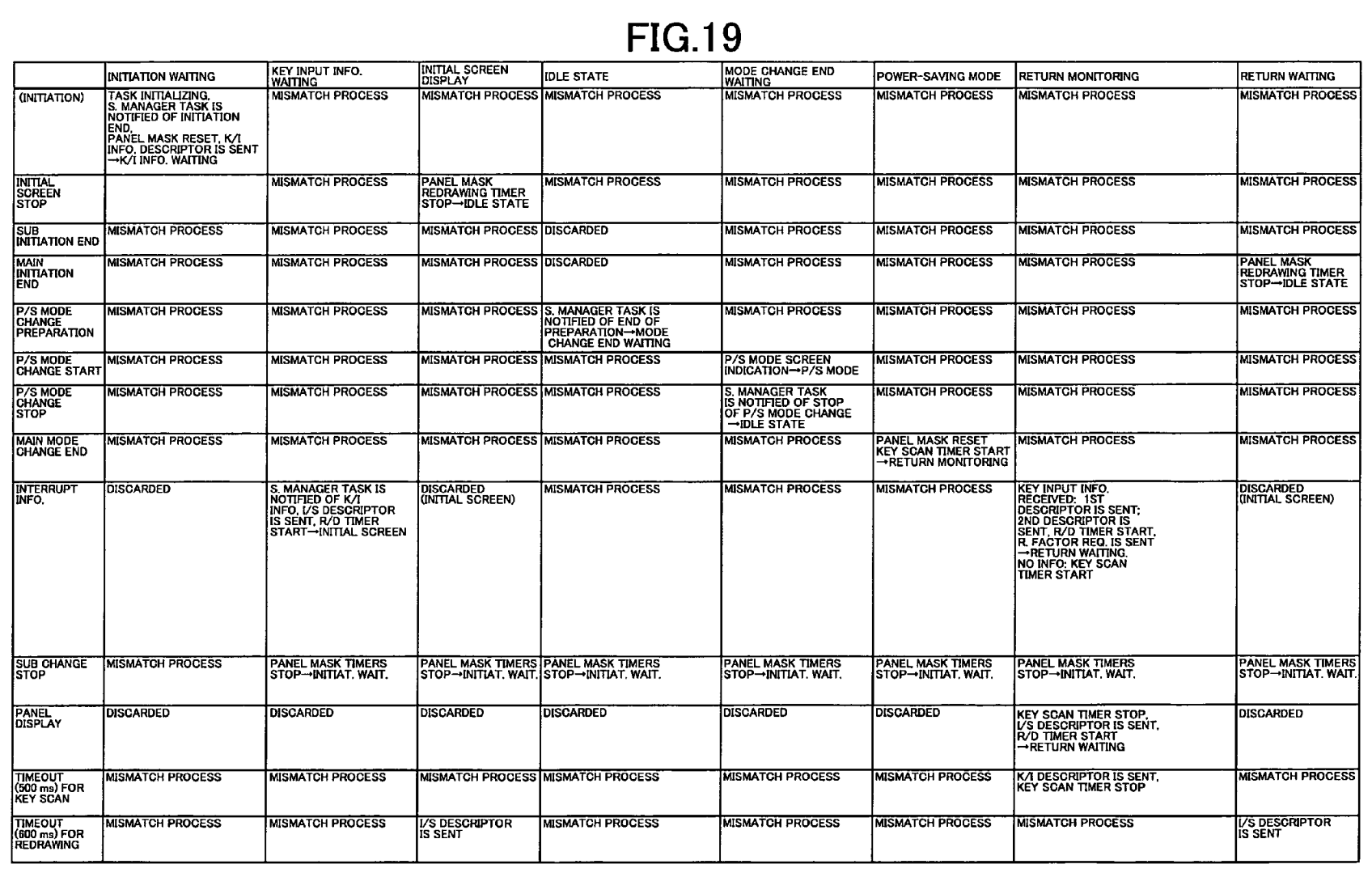

FIG. 19 shows the state transition table of the panel task (1308). The panel task in this example transmits a command to the controller device of the operation panel (5416) and key information is received by polling. In the power saving state, polling is performed using the key scan timer.

As shown in FIG. 19, the panel task (1308) receives the message from the sub-manager task (1301). When the panel task is in the state "under power-saving return monitoring" after the panel task is changed to the power saving mode, interruption of key ON which is a return factor sent from the controller device of the operation panel (5416) is detected. The panel task at this time transmits the return factor detection message to the sub-manager task (1301).

This embodiment enables it to support the returning from the power saving mode by detection of the data input from a USB device (peripheral device connected by USB). For this reason, the USB response task (1307) is provided to detect the data input from the USB device as a return factor from the power saving mode.

FIG. 20 shows the state transition table of the USB response task (1307) in which detection of the return factor is enabled. As shown in FIG. 20, after the main control system works (the image input/output processing in the normal mode), if the USB response task (1307) receives a power-saving change execution request in the power-saving change state ("state 3"), it enters into the power saving mode ("state 4").

Simultaneously, return factor detection is started by the USB response task. When the data input from the USB device is detected as a return factor in the power saving mode of "state 4", the USB response task (1307) transmits a return factor detection message to the sub-manager task (1301).

Similar to the other return factor detection mentioned above, the sub-manager task (1301) which receives the return factor detection message from the USB response task (1307) requests the PM (power management) task (1304) to perform the return processing of the main control system.

The USB under the control of the sub-system (which is formed by the ASIC2 (5264) or by the ASIC2 (5417) in FIG. 1) connects the external peripheral device to the MFP as the general-purpose I/F, and enables performing the plug and play operation. Therefore, the USB is maintained in the active state (conduction state) even at the time of the power saving mode, which allows the user to perform data input output using a USB device at any time, without requiring special operation. Moreover, the user can use various kinds of USB devices freely by the plug and play operation.

The above-mentioned sub-system is provided so that the operation of returning from the power saving mode of the main control system is performed by detection of the data input from a USB device. Similarly, the sub-system (ASIC2 (5264)) of the invention may be provided so that the operation of returning from the power saving mode of the main control system is performed by detection of hot swapping of a USB device.

That is, when hot swapping of a USB device (attaching or detaching of the USB cable) is detected as a return factor in the power saving mode of "state 4", the USB response task (1307) transmits a return factor detection message to the sub-manager task (1301). Similar to the other return factor detection mentioned above, the sub-manager task (1301) which receives the return factor detection message from the USB response task (1307) requests the PM (power management) task (1304) to perform the return processing of the main control system.

The MFP of this embodiment is provided with the main control system in which the mechanism for supporting the above-mentioned use of the USB is implemented by the software composition.

Figure 21:
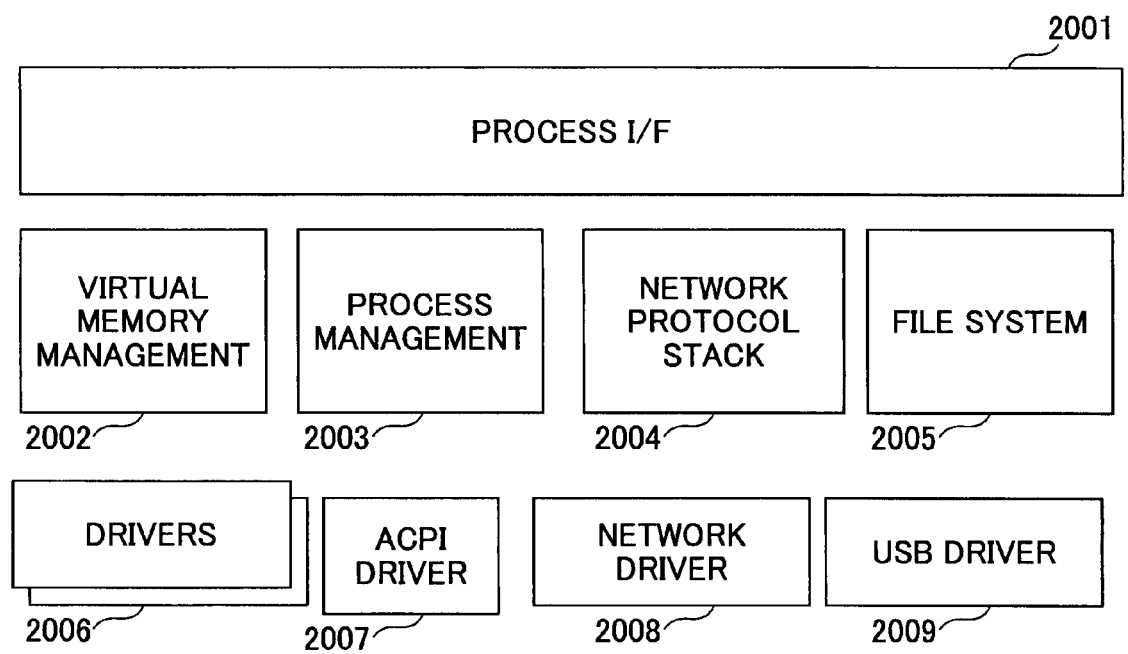
FIG. 21 is a diagram showing the composition of the general-purpose OS layer in the main control system of the control system of FIG. 1.

FIG. 21 shows the composition of the general-purpose OS layer of the controller (5410). The general-purpose OS layer is an element of the software composition (FIG. 2) of the controller (5410) shown previously.

The blocks in the software composition of FIG. 21 include the following components.
- 2001: Process I/F
- 2002: Virtual Memory Control
- 2003: Process Control
- 2004: Network Protocol Stack
- 2005: File System (which manages the memory part storing images files created within the MFP)
- 2006: Drivers (including engine drivers)
- 2007: ACPI Driver (advanced configuration power interface driver which supports the power-saving mechanism of the hardware)
- 2008: Network Driver
- 2009: USB Driver The OS layer shown in FIG. 21 manages the hardware resources and offers the interface to the upper layer. The ACPI driver (2007) is a driver provided for supporting the power-saving mechanism of the hardware, such as the CPU (5404). The power saving state of the hardware is controlled by operation of this driver. It is feasible by implementing the functions equivalent to the ACPI realized by the IBM-AT compatible architecture. Operation related to the USB driver (2009) will be explained later.

The USB driver (2009) manages the hardware of USB and offers the function to the process layer via the process I/F (2001). The network driver (2008) drives the network hardware and offers the network communication function independent of the hardware to the network protocol stack (2004).

The main control system has the composition shown in FIG. 21 in the OS layer which manages the hardware resources, which enables the support of the power saving operation in which the power supply to the CPU (5404) in the main control system is turned OFF. That is, in the power saving mode, the CPU (5404) is in OFF state and the data on the RAM remain in the stored state, and at the time of returning from the power saving mode, the CPU (5404) works as if the control is returned the ACPI driver (2007).

However, the sub-system (formed by the ASIC2 (5264) or the ASIC2 (5417) in FIG. 1) is always maintained in the active state (conduction state), and there is the possibility that the state of the hardware under control of the sub-system is changed by the attaching or detaching of the USB device during the power saving mode.

In addition, it may be necessary for a certain device that, when changing to the power saving node, the operation of changing to the power saving state is performed after the pre-processing is performed. In the case of a USB driver, when the state of USB is in a configured state, transmission and reception of data to the end points, such as bulk in/out is made possible. However, since receiving data in the power saving state is not desirable, the DMA in the normal operation state is stopped. When receiving data is present at the bulk out port in the power saving mode, NAK response is returned by the hardware. And after the operation of returning from the power saving state is performed, the data receiving is performed.

When the above structure is provided, the main control system (USB driver) conventionally cannot recognize change of the state of the USB device.

Since the USB driver cannot recognize change of the state of the USB device which may arise in the power saving mode, there is a possibility that mismatching may arise between the state held by the main control system (USB driver) immediately before changing to the power saving mode, and the state of the USB device which is changed during the power saving mode, which may cause an error in operation after returning from the power saving mode.

To obviate the problem, the USB device driver of this embodiment holds the state of the USB device at the time of changing to the power-saving mode. After returning from the power saving mode, the USB device driver compares the held state of the USB device at the time of changing to the power-saving mode with the state of the hardware of the USB device actually loaded. If there is mismatching, correction processing which makes a state transition of the USB device driver coincide with the actual state transition of the USB device is performed.

Even when power supply OFF/ON of the device (for example, host PC) connected by the USB or hot swapping of a USB cable is performed during the power-saving mode, the state transition of the USB device driver is thus corrected after returning from the power-saving mode, and performing the normal operation can be continued without error.

Figure 22:
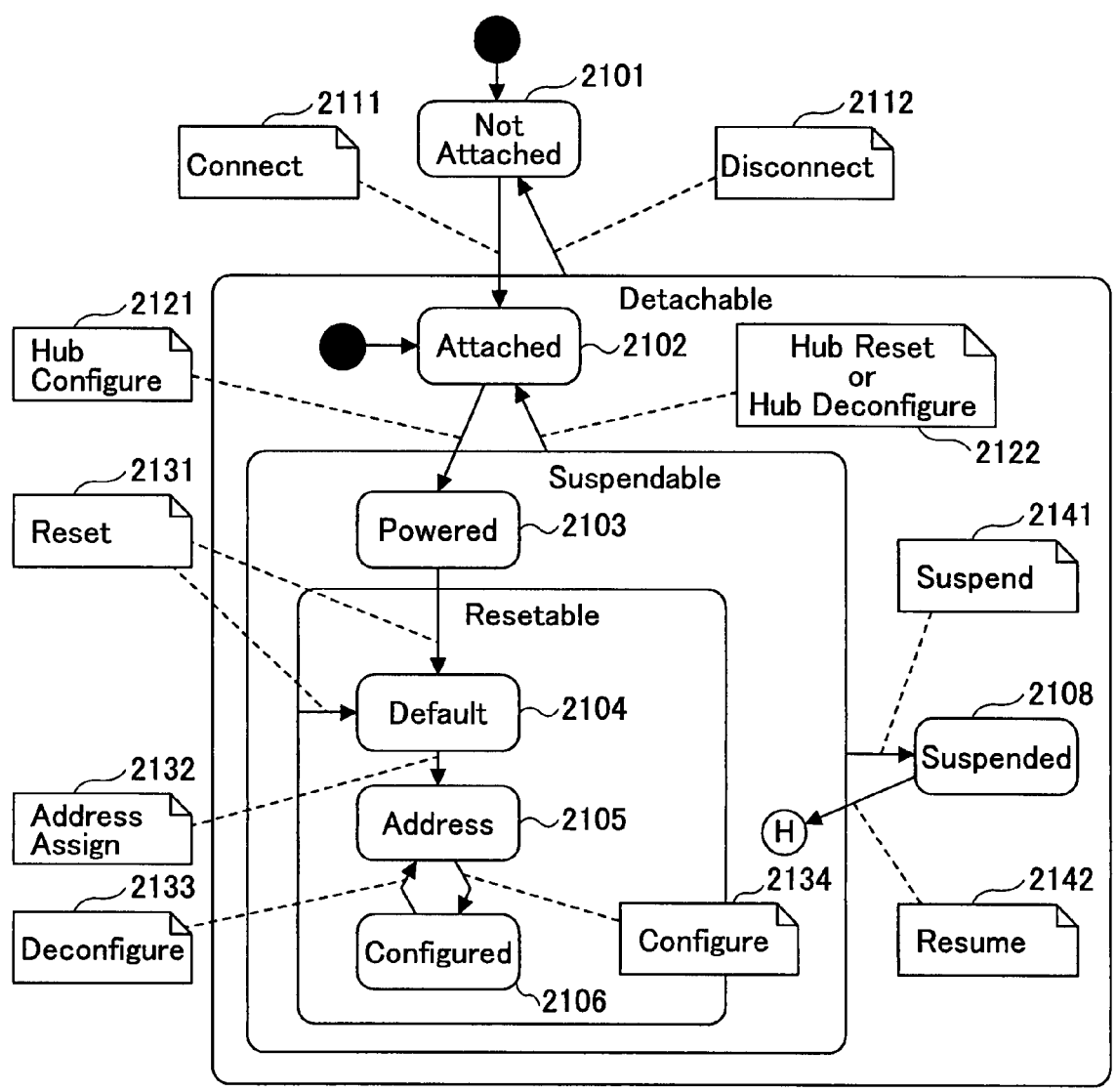
FIG. 22 is a diagram showing the state transition of the USB device connected through the sub-system (ASIC2).

FIG. 22 shows the state transition of a USB device. In the state transition diagram of FIG. 22, the notation of the Harel's state transition diagram for use in the UML (unified modeling language) etc. is used. Description of a nested state is allowed in this notation.

The blocks in the state transition diagram of FIG. 22 include the following elements.
- 2101: Not Attached (non-connected state)
- 2102: Attached (connected state)
- 2103: Powered (conduction state)
- 2104: Default (default state)
- 2105: Address (address state)
- 2106: Configured (set-up state)
- 2108: Suspended (stop state).

Each of the above elements indicates a state of the USB device. Each of the following elements indicates an operation of the USB device.
- 2111: Connect (connection)
- 2112: Disconnect (connection resetting)
- 2121: Hub Configure (hub setting)
- 2122: Hub Reset or Hub Deconfigure (hub resetting)
- 2131: Reset (resetting)
- 2132: Address Assign (address assignment)
- 2133: Deconfigure (resetting)
- 2134: Configure (setting)
- 2141: Suspend (stop)
- 2142: Resume (return).

Generally, in the device chip on the side of a USB function, realizing management of the state transition by the hardware logic is common. Therefore, the USB device driver can recognize a change of the USB device by monitoring the state or receiving the interruption.

Suppose that a USB device which operates according to the state transition diagram of FIG. 22 is in the state of Configured (2106) immediately before changing to the power saving mode, and the state of the USB device is changed to the state of Powered (2103) after returning from the power saving mode. In this case, there is no direct state transition, and it is determined that detaching or attaching occurred during the power saving mode and the state of the USB device was returned to the state of Attached (2102) or Not Attached (2101) and then it was changed to the state of Powered (2103).

In this case, there is also the possibility that detaching and attaching occurred repeatedly. Such operation may arise when the detection of hot swapping of the USB device is not the return factor from the power saving mode.

Although it is dependent on the structure of the USB device driver, it can be estimated that the state of the USB device drive is returned according to the shortest state transition regardless of the actual state changes. Making the state of the USB device drive be returned according to the shortest state transition based on this assumption can suppress the mismatching between the state of the USB device driver and the state of the actual USB device, if an estimated state transition sequence is created for the state of the USB device driver such that no conflict does not arise.

In this embodiment, the following serial number is assigned for each state of a USB device as information indicating the specific state of the USB device:

Not Attached=0
Attached=1
Powered=2
Default=3
Address=4
Configured=5

In this regard, since the state of Suspended (2108) is detected by the hardware only, this state is disregarded by the software as not being relevant to the state change or return.

Bearing in mind the assignment of the above serial number for the USB device state, suppose that x denotes the serial number indicating the state of a USB device before state change and y denotes serial number indicating the state of the USB device after returning from the state change. When x<y, it can be considered that the estimated state transition sequence starts from x and ends at y. When y<x and y=0 or 1, it can be considered that the estimated state transition sequence directly ends at 0 or 1. When y is equal to 2 or more, it can be considered that the estimated state transition sequence changes to 1 and goes up to y.

The reason why the estimated state transition sequence mentioned above can be considered is as follows. If the after-return state y is equal to 0, it can be considered that connection of the USB device is in the cut-off state (Not Attached=0) as a result of the state change, whatever the before-change state x is. As indicated in the state transition diagram of FIG. 22, the state of the USB device after it is changed to the state of Disconnect can be changed to the state of Not Attached from any state. The USB device driver is provided so that the state of the USB device can be changed to the state of Not Attached=0 from any state.

Similarly, if y indicates the state immediately before the state of Connect (Attached=1) regardless of the number of x (whatever state it was), it can be considered that it is in the state with which hub resetting has occurred. As indicated in the state transition diagram of FIG. 22, the state transition is either the direct change to the state of Attached=1 after the hub resetting state (Hub Reset or Hub Deconfigure) occurred, or the changes from the state of Not Attached=0 to the state of Attached=1. In the latter case, even if the direct change to the state of Attached=1 is estimated, the mismatching between the state of the USB device and the state of the USB device driver can be suppressed. The mismatching can be suppressed by disregarding the difference between the two cases and presuming that it is changed to the state of Attached directly.

When y is equal to two or more and x>y, no state changes from a large number to a small state do not exist except for the state of Deconfigure, as indicated in the state transition diagram of FIG. 22. Although special consideration may be given to the state of Deconfigure and direct state transition may be considered only for the state change from Configured=5 to Address=4, the changes to the state of Deconfigure are not common in the normal operation of the actual USB device. Thus, at the time of y>=2 and x>y, it is assumed that the state of the USB device is changed to the state of Attached=1 and then changed to the state of y. By this estimated state transition, it is possible to suppress the mismatching between the state of the USB device driver and the state of the USB device.

In order to suppress the mismatching which may occur between the state of the USB device driver and the state of the actual USB device, an estimated state-transition sequence is generated based on the above-mentioned conditions.

The USB device is set in a communication-permitted state when it is in the state of Configured=5, and the outputting or inputting of data between the USB device and the MFP of this embodiment or the data transfer therebetween is permitted at this time.

Figure 23:
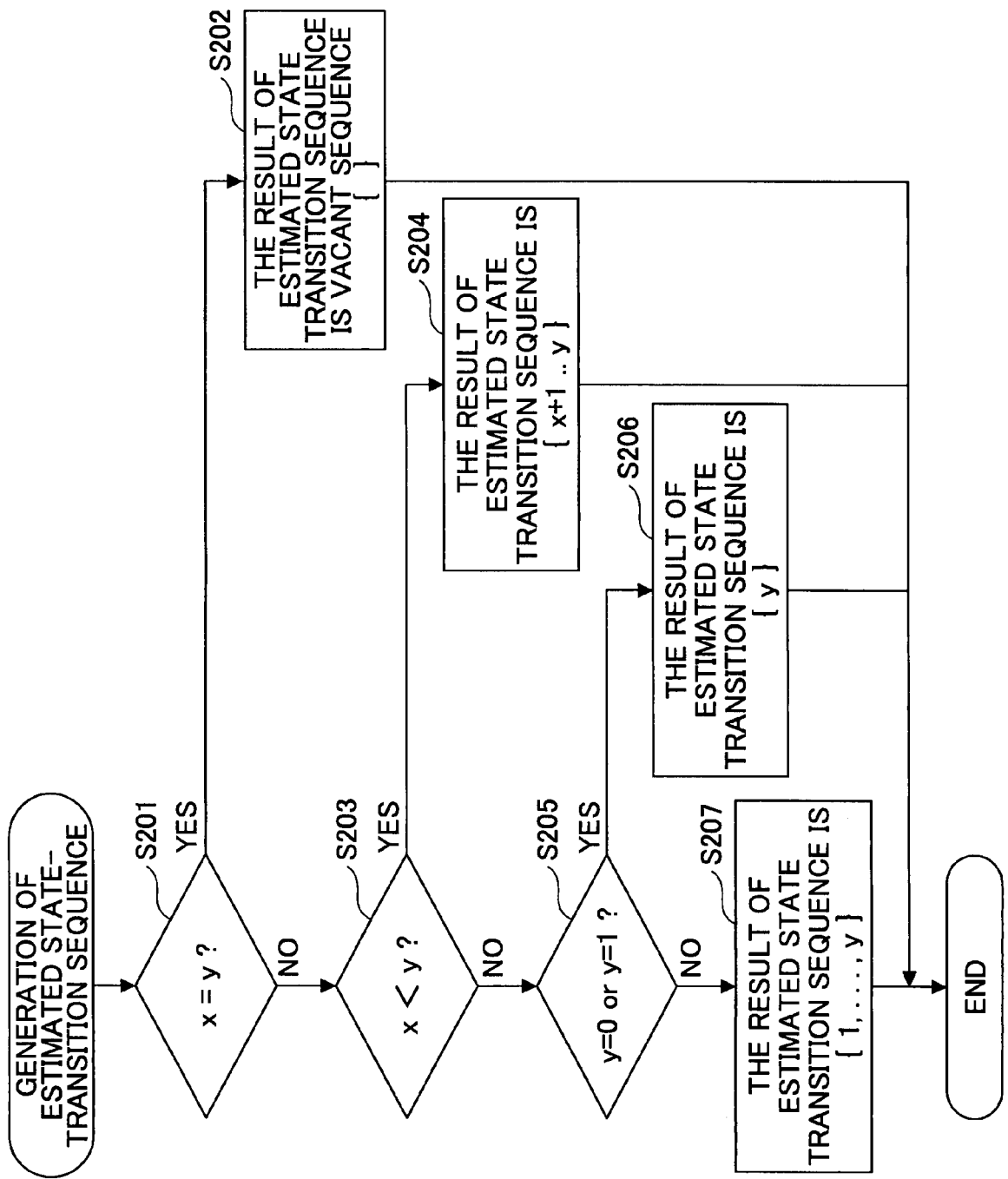
FIG. 23 is a flowchart for explaining the processing of generating an estimated state-transition sequence.

FIG. 23 is a flowchart for explaining the processing of generating an estimated state-transition sequence. Upon start of the flowchart of FIG. 23, it is determined whether the condition x=y is met (step S201).

When the condition x=y is met, it is a case where the state transition has not arisen, and a vacant estimated state-transition sequence { } is generated as the result (step S202). And the processing is ended.

On the other hand, when the condition x=y is not met, it is a case where the state transition has arisen. In this case, the processing is branched depending on whether the state changes returning from the state of Configured=5 to the state of Attached=1 or Not Attached=0 have arisen.

It is determined whether the condition x<y is met (step S203). When the condition x<y is met (or when the result of the determination at step S203 is affirmative), an estimated state-transition sequence {x+1, . . . , y} in which the serial number is simply incremented from x to y for each state is generated as the result (step S204). And the processing is ended. This is because the device state is once changed to the state of Attached=1 or Not Attached=0 but the state after the return is progressing ahead of the state prior to the change to the power saving mode, and what is necessary is just to change from the current state to the state after the return.

On the other hand, when the condition x>y is met (or when the result of the determination at step S203 is negative), it is a case where the changes returning from the state of Configured=5 to the state of Attached=1 or Not Attached=0 have arisen. In this case, the processing is branched depending on whether the after-return state y is the state of Attached=1 or the state of Not Attached=0.

It is determined whether the condition y=0 or y=1 is met (step S205). When the condition y=0 or y=1 is met (or when the result of the determination at step S205 is affirmative), an estimated state-transition sequence {y} in which the serial number changes to y immediately is generated as the result (step S206). And the processing is ended.

On the other hand, when the condition y=0 or y=1 is not met (or when the result of the determination at step S205 is negative), an estimated state-transition sequence {1, . . . , y} in which the serial number is changed to 1 immediately and incremented to y is generated the result (step S207). And the processing is ended.

For example, if the before-change state prior to the power saving mode is the state of Configured=5 and the after-return state is the state of Default=3, the result of an estimated state-transition sequence based on the above-mentioned conditions is set to {1, 2, 3}.

According to the estimated state-transition sequence generated as mentioned above, the mismatching which may occur between the state of the USB driver and the state of the actual USB device can be suppressed.

The mismatching which may occur in the power-saving control processing is suppressed in the following control processing by operation of the ACPI driver (2007) which controls the power saving state. The ACPI driver (2007) performs the above-mentioned control processing as part of the change and return processing. In the change and return processing, the processing needed to suppress the mismatching is performed at the time of changing to and returning from the power saving mode, and the registering processing is also performed in which a change hook routine used for the processing of changing to the power saving mode and a return hook routine used for the processing of returning from the power saving mode are registered.

Figure 24:
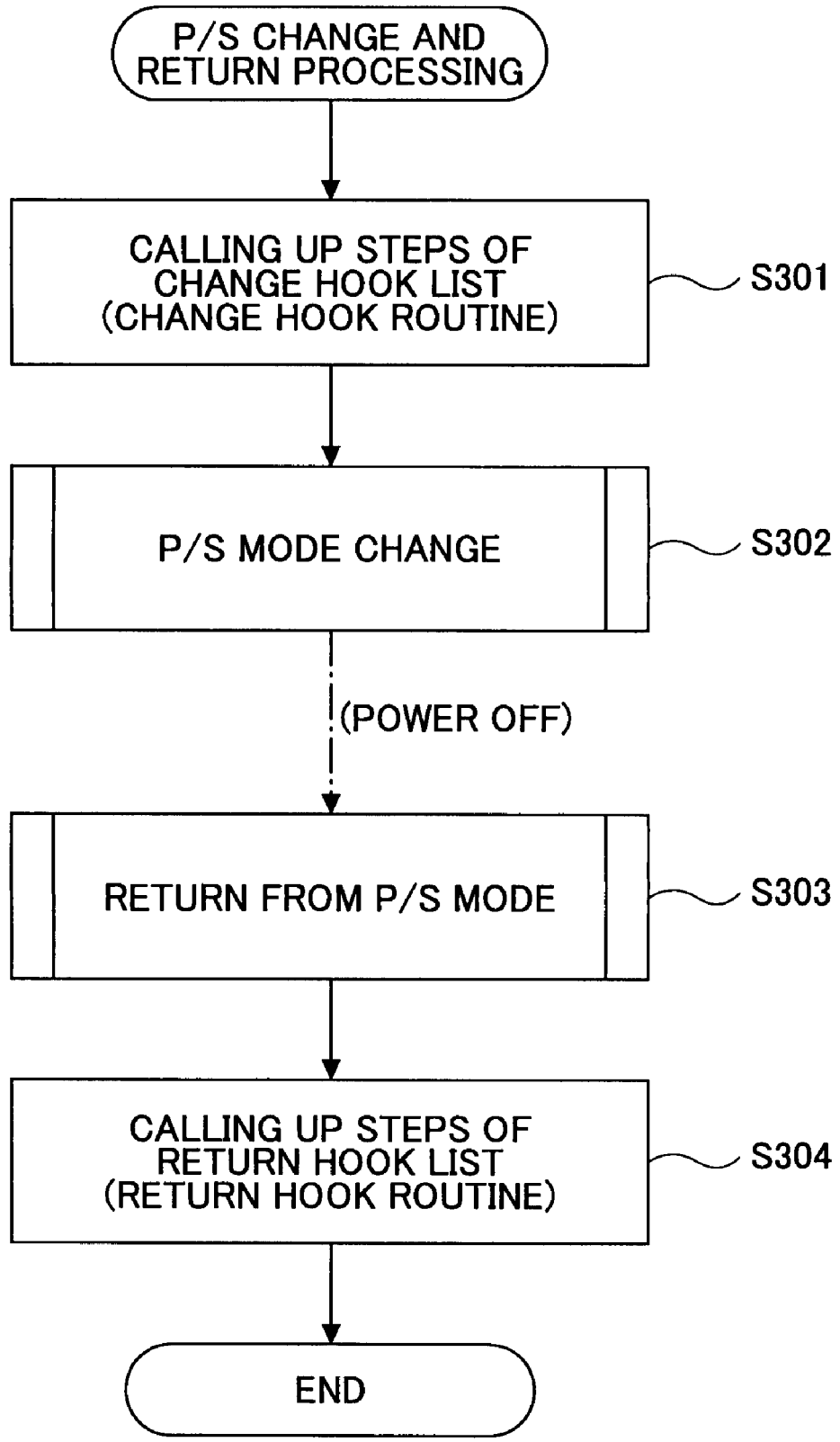
FIG. 24 is a flowchart for explaining the power-saving change and return processing performed by an ACPI driver.
Figure 25:
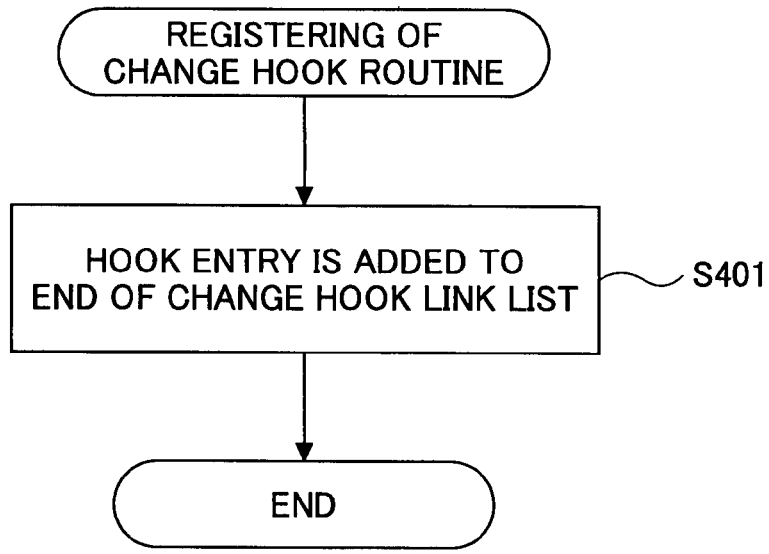
FIG. 25 is a flowchart for explaining the processing of registering a change hook routine to a change hook list.
Figure 26:
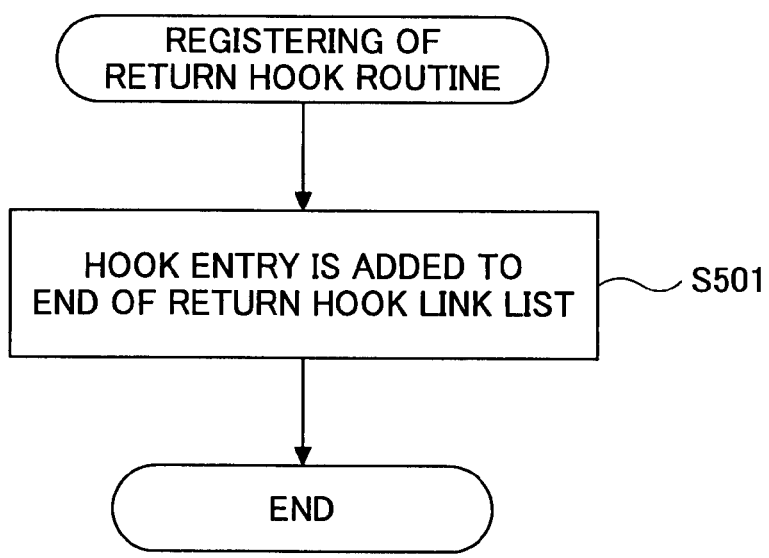
FIG. 26 is a flowchart for explaining the processing of registering a return hook routine to a return hook list.

FIG. 24 is a flowchart for explaining the power saving mode change and return processing. FIG. 25 is a flowchart for explaining the processing of registering the change hook routine to a change hook list. FIG. 26 is a flowchart for explaining the processing of registering the return hook routine to a return hook list.

Upon start of the power saving mode change and return processing of FIG. 24, the ACPI driver (2007) calls up, prior to the change to the power saving mode, the routine of change processing of a relevant device from the change hook routine registered in the change hook list (step S301).

In the registering processing, the devices which are mounted by the respective device drivers (including the USB driver (2009) of this embodiment) at the time of initialization are registered as shown in the flowchart of FIG. 25. By adding the hook entry to the end of the change hook link list, the registering processing entry is added to the change hook list (step S401).

Subsequently, the power saving mode change processing is performed using the change hook routine called from those registered in the change hook list as mentioned above (step S302) as shown in FIG. 24.

Figure 27:
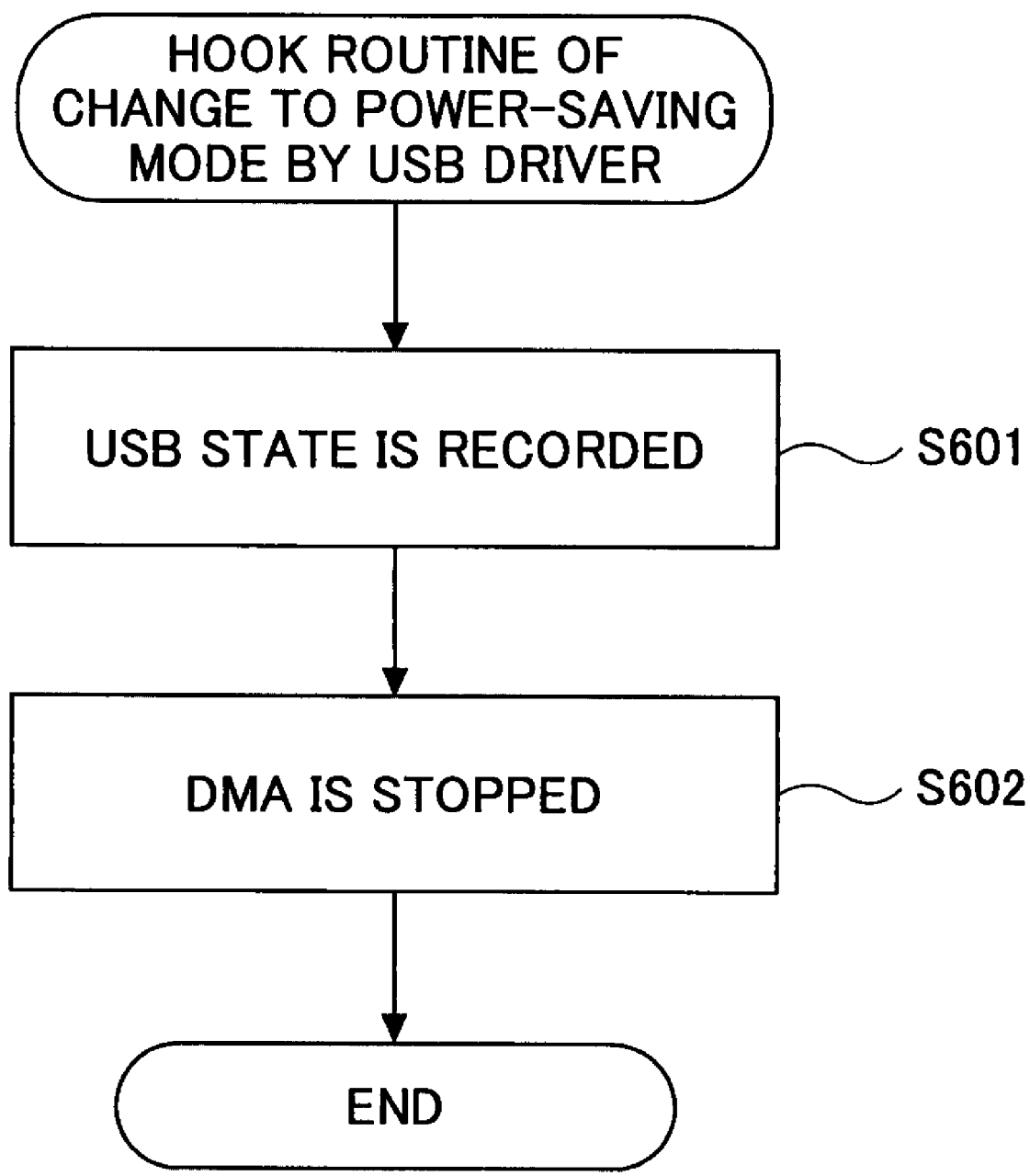
FIG. 27 is a flowchart for explaining the hook routine of changing to the power saving state which is registered with a USB driver.

FIG. 27 is a flowchart for explaining the change hook routine registered with the USB driver (2009). When the USB device is in the state of Configured before the power saving mode change, receiving of data by the USB device is possible and there is a possibility that data packets are received from the host device during the power saving mode.

If the DMA (direct memory access) of the USB device of FIG. 6 is stopped when it is in the data-receivable state, the USB control unit performs NAK response on the USB bus when a data packet is received, and the USB device is in the state in which data is not received. If the data receiving state is detected (which is considered as a return factor from the power saving mode), the return processing is performed. After the return from the power saving mode, it is necessary to start the DMA of the USB device in order to resume data receiving.

In the power saving mode change processing (step S302), the state of the USB device prior to the power saving change (see the state transition diagram of FIG. 22) is recorded by the USB change hook routine of FIG. 27 (step S601).

Subsequently, the DMA is stopped so that the data transmitted from the USB device through the sub-system may not be received (step S602) and the control is shifted from the change hook routine.

The power saving mode return processing is performed at the time of returning from the power saving mode (step S303). At this time, the routine of the return processing of the relevant device which is needed for the return processing is called up from the return hook routine registered into the return hook list (step S304).

The processing of registering the devices to the return hook list is performed according to the flowchart of FIG. 26. In the registering processing, the devices which are mounted by the respective device drivers (including the USB driver (2009) of this embodiment) at the time of initialization are registered. By adding the hook entry to the end of the return hook link list, the registering processing entry is added to the return hook list (step S501).

Figure 28:
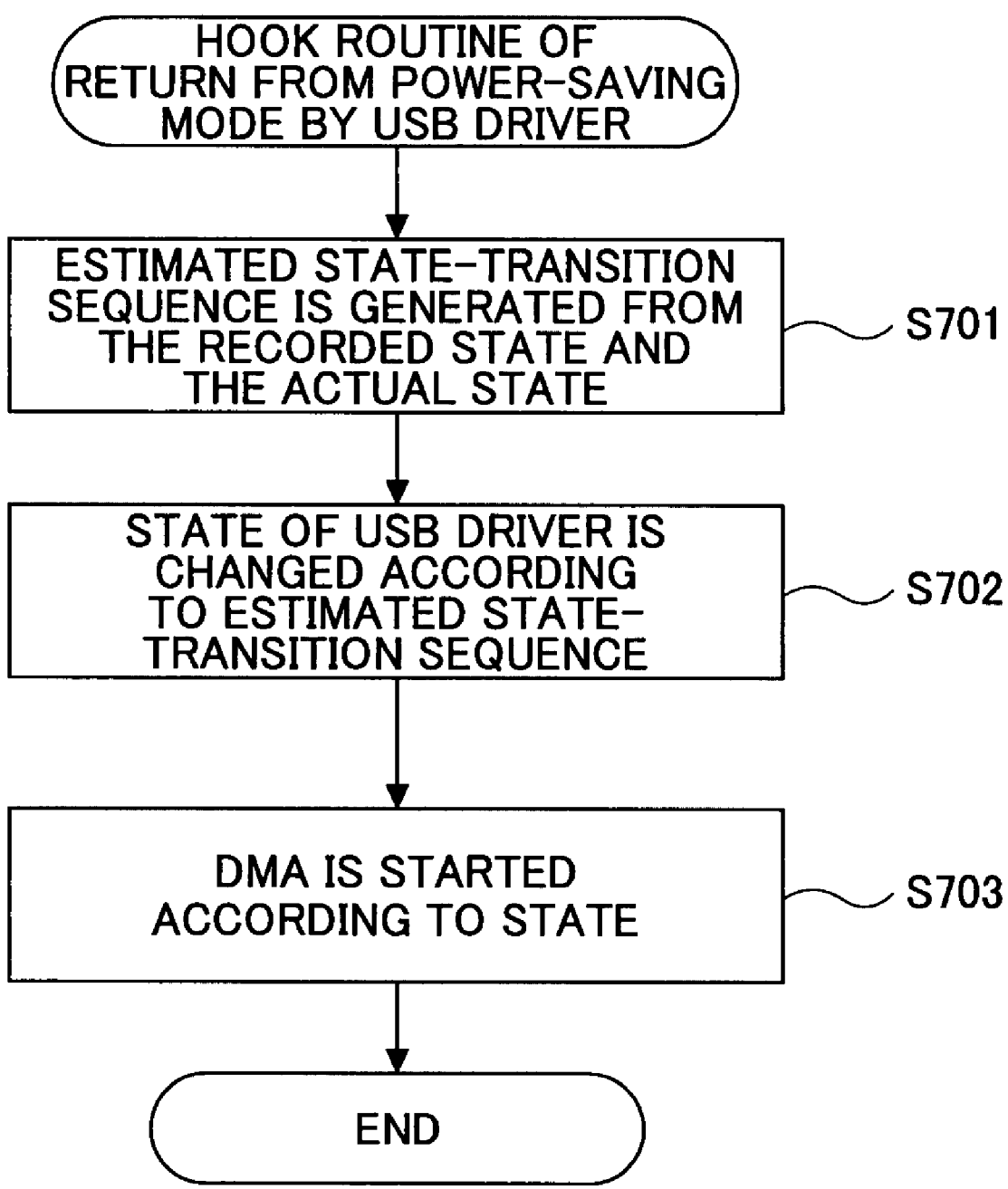
FIG. 28 is a flowchart for explaining the hook routine of returning from the power saving state which is registered with a USB driver.

FIG. 28 is a flowchart for explaining the return hook routine registered with the USB driver (2009). In the power saving mode return processing, an estimated state-transition sequence is generated according to the USB return hook routine of FIG. 28 based on both the recorded state of the USB device prior to the change to the power saving mode, which is recorded in the above the power saving mode change processing (see the state transition diagram of FIG. 22), and the current state of the USB device (step S701). The estimated state-transition sequence is generated at this time according to the estimated state-transition sequence generating processing of FIG. 23 mentioned above.

Subsequently, the state of the USB device driver (2009) is changed according to the estimated state-transition sequence generated at the step S701, and the mismatching between the state of the USB device drive and the current state of the USB device is suppressed by the changed state information (step S702).

Subsequently, the DMA is started so that the data transmitted from the USB device through the sub-system may be received according to the state (step S703). The control is shifted from the return hook routine and the change and return processing by the ACPI driver (2007) is ended.

Accordingly, the mismatching of the device state between the USB device driver (provided in the main control system) and the USB device (connected to the image processing device) is suppressed by the operation performed at the time of the power saving mode, and the operational problem which may occur at the time of returning from the power saving mode can be avoided and proper operation can be ensured.

This invention is not limited to the above-described embodiments and variations and modifications may be made without departing from the scope of the invention.

This application is based upon and claims the benefit of priority of Japanese patent application No. 2005-218792, filed on Jul. 28, 2005, Japanese patent application No. 2005-225240, filed on Aug. 3, 2005, and Japanese patent application No. 2006-202443, filed on Jul. 25, 2006, the entire contents of which are incorporated by reference.

The invention claimed is:

1. An image processing device including a main control unit and a sub-control unit, the main control unit controlling each of an image input unit, an image processing unit, and an image output unit, the sub-control unit controlling power supply to the main control unit to change a mode of the image processing device to a power saving mode and to cause the mode of the image processing device to return from the power saving mode, and the sub-control unit controlling response and transmission of a network interface and a USB device provided in the image processing device for inputting or outputting of image data, the image processing device comprising:

a state holding unit holding a state of a USB device driver provided in the main control unit;

a state transition unit changing a state of the USB device driver; and a state acquiring unit acquiring a state of the USB device,
wherein the state holding unit holds a state, referred to as a held state, of the USB device driver before the mode of the image processing device is changed to the power saving mode, and when the state of the USB device acquired by the state acquiring unit after the mode of the image processing device returns from the power saving mode, referred to as an acquired state, differs from the held state of the USB device driver held by the state holding unit, the state transition unit determines an estimated state-transition sequence for changing a state of the USB device driver, based on a result of comparison of the held state of the USB device driver and the acquired state of the USB device, and changes the state of the USB device driver according to the estimated state-transition sequence.

2. The image processing device according to claim 1, wherein the state transition unit determines, when the acquired state of the USB device is nearer to a communication-permitted state than the held state of the USB device driver, an estimated state-transition sequence which indicates a state transition from the held state of the USB device driver to the acquired state of the USB device.

3. The image processing device according to claim 1, wherein the state transition unit determines, when the held state of the USB device driver is nearer to a communication-permitted state than the acquired state of the USB device, an estimated state-transition sequence which indicates a state transition from an initial state to the acquired state of the USB device.

4. The image processing device according to claim 1, wherein the image processing device stops a performing of direct memory access DMA for transferring data of the USB device when changing to the power saving mode, and start, when returning from the power saving mode, performing the direct memory access DMA according to a state of the USB device driver after an end of the state transition.

5. The image processing device according to claim 1, wherein the sub-control unit causes the mode of the image processing device to return from the power saving mode when receiving of data input from the USB device is detected.

6. The image processing device according to claim 1, wherein the sub-control unit causes the mode of the image processing device to return from the power saving mode when hot swapping of the USB device is detected.

7. A method of controlling an image processing device including a main control unit and a sub-control unit, the main control unit controlling each of an image input unit, an image processing unit, and an image output unit, the sub-control unit controlling power supply to the main control unit to change a mode of the image processing device to a power saving mode and to cause the mode of the image processing device to return from the power saving mode, and the sub-control unit controlling response and transmission of a network interface and a USB device provided in the image processing device for inputting or outputting of image data, the method comprising:
holding a state of a USB device driver provided in the main control unit;
changing a state of the USB device driver;
acquiring a state of the USB device;
determining whether the state of the USB device acquired in the acquiring after the mode of the image processing device returns from the power saving mode differs from the held state of the USB device driver held in the state holding step;
estimating a state-transition sequence for changing a state of the USB device driver using a result of the determining; and
changing the state of the USB device driver using the estimated state-transition sequence.

8. The method of controlling the image processing device according to claim 7, wherein the estimating comprises, when the acquired state of the USB device is nearer to a communication-permitted state than the held state of the USB device driver, determining an estimated state-transition sequence which indicates a state transition from the held state of the USB device driver to the acquired state of the USB device.

9. The method of controlling the image processing device according to claim 7, wherein the estimating comprises, when the held state of the USB device driver is nearer to a communication-permitted state than the acquired state of the USB device, determining an estimated state-transition sequence which indicates a state transition from an initial state to the acquired state of the USB device.

10. The method of controlling the image processing device according to claim 7, wherein the image processing device stops a performing of direct memory access DMA for transferring data of the USB device when changing to the power saving mode, and starts, when returning from the power saving mode, performing the direct memory access DMA according to a state of the USB device driver after an end of the state transition.

11. The method of controlling the image processing device according to claim 7, wherein the mode of the image processing device returns from the power saving mode when receiving of data input from the USB device is detected.

12. The method of controlling the image processing device according to claim 7, wherein the mode of the image processing device returns from the power saving mode when hot swapping of the USB device is detected.

* * * * *